US012270949B2

(12) United States Patent
Piggott et al.

(10) Patent No.: US 12,270,949 B2
(45) Date of Patent: Apr. 8, 2025

(54) DUAL PATH LIGHT DETECTION AND RANGING SYSTEM

(71) Applicant: Pointcloud Inc., San Francisco, CA (US)

(72) Inventors: Alexander Yukio Piggott, San Mateo, CA (US); Alexander Alexeevich Gondarenko, San Jose, CA (US); Steven Andrew Fortune, Wanaka (NZ); Andrew James Compston, San Francisco, CA (US); Robert Francis Wiser, San Francisco, CA (US); Remus Nicolaescu, San Francisco, CA (US)

(73) Assignee: Pointcloud Inc., Zurich (CH)

( * ) Notice: Subject to any disclaimer, the term of this patent is extended or adjusted under 35 U.S.C. 154(b) by 1097 days.

(21) Appl. No.: 17/096,399

(22) Filed: Nov. 12, 2020

(65) Prior Publication Data
US 2021/0141058 A1   May 13, 2021

Related U.S. Application Data

(60) Provisional application No. 62/934,247, filed on Nov. 12, 2019.

(51) Int. Cl.
*G01S 7/484* (2006.01)
*G01S 7/481* (2006.01)
(Continued)

(52) U.S. Cl.
CPC ............ *G01S 7/484* (2013.01); *G01S 7/4818* (2013.01); *G01S 7/4861* (2013.01); *G01S 7/497* (2013.01); *G01S 17/34* (2020.01)

(58) Field of Classification Search
CPC .............................. G01S 7/4861; G01S 7/497
See application file for complete search history.

(56) References Cited

U.S. PATENT DOCUMENTS 10,338,321 B2    7/2019  Hosseini et al.
2017/0242105 A1  8/2017  Dussan et al.
(Continued)

FOREIGN PATENT DOCUMENTS

WO    WO-2018106729 A1    6/2018
WO    2018160729          9/2018
WO    2021097064          5/2021

OTHER PUBLICATIONS

M. W. AlTaha, H. Jayatilleka, Z. Lu, J. F. Chung, D. Celo, D. Goodwill, E. Bernier, S. Mirabbasi, L. Chrostowski, and S. Shekhar, "Monitoring and automatic tuning and stabilization of a 2×2 MZI optical switch for large-scale WDM switch networks," Opt. Express 27, 24747-24764 (2019). (Year: 2019).*

(Continued)

*Primary Examiner* — Luke D Ratcliffe
*Assistant Examiner* — Zhengqing Qi
(74) *Attorney, Agent, or Firm* — Schwegman, Lundberg & Woessner, P.A.

(57) ABSTRACT

A dual path configuration Integrated LiDAR architecture can contain a focal plane transmitter and a focal plane coherent receiver. The integrated LiDAR transmitter can contain an optical frequency chirp generator and a focal plane optical beam scanner with integrated driving electronics. The integrated LiDAR receiver architecture can be implemented with per-pixel coherent detection and amplification.

16 Claims, 23 Drawing Sheets

(51) Int. Cl.
  *G01S 7/4861* (2020.01)
  *G01S 7/497* (2006.01)
  *G01S 17/34* (2020.01)

(56) References Cited

U.S. PATENT DOCUMENTS

| | | |
|---|---|---|
| 2018/0172918 A1* | 6/2018 | Lane .................. H04Q 11/0003 |
| 2019/0011559 A1 | 1/2019 | Desai et al. |
| 2019/0018198 A1 | 1/2019 | Sayyah et al. |
| 2019/0235053 A1* | 8/2019 | Spector .................. G01S 17/10 |
| 2019/0265574 A1 | 8/2019 | Skirlo et al. |

OTHER PUBLICATIONS

"The Multiplexer" and "The Demultiplexer" accessed from "www.electronics-tutorials.ws/combination/comb_2.html" and "www.electronics-tutorials.ws/combination/comb_3.html" with WayBack Machine dated Feb. 9, 2008. (Year: 2008).*
"European Application Serial No. 20888706.7, Extended European Search Report mailed Nov. 24, 2022", 8 pgs.
Celo, Dritan, "32×32 silicon photonic switch", 2016 21st Optoelectronics and Communications Conference (OECC) Held Jointly With 2016 International Conference on Photonics in Switching (PS), IEICE, (Jul. 3, 2016), 1-3.
"International Application Serial No. PCT US2020 060188, International Search Report mailed Feb. 8, 2021", 2 pgs.
"International Application Serial No. PCT US2020 060188, Written Opinion mailed Feb. 8, 2021", 4 pgs.
"International Application Serial No. PCT US2020 060188, International Preliminary Report on Patentability mailed May 27, 2022", 6 pgs.
"European Application Serial No. 20888706.7, Response filed May 24, 2023 to Extended European Search Report mailed Nov. 24, 2022", 8 pgs.
"European Application No. 23177208.8 Extended European Search Report mailed on Dec. 2, 2024", 10 pgs.

* cited by examiner

DUAL PATH LIGHT DETECTION AND RANGING SYSTEM

PRIORITY

This application claims the benefit of priority to U.S. Provisional Patent Application Ser. No. 62/934,247, filed Nov. 12, 2019, which is incorporated by reference herein in its entirety.

TECHNICAL FIELD

The present disclosure generally relates to special-purpose machines that perform optical processing and improvements to such variants, and to the technologies by which such special-purpose machines become improved compared to other special-purpose machines for optical based detection and ranging.

BACKGROUND

Conventional light detection and ranging systems (LIDAR) systems are bulky and difficult to integrate into a compact chip package in a commercially practical approach.

BRIEF DESCRIPTION OF THE DRAWINGS

To easily identify the discussion of any particular element or act, the most significant digit or digits in a reference number refer to the figure ("FIG.") number in which that element or act is first introduced.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Figure 1:
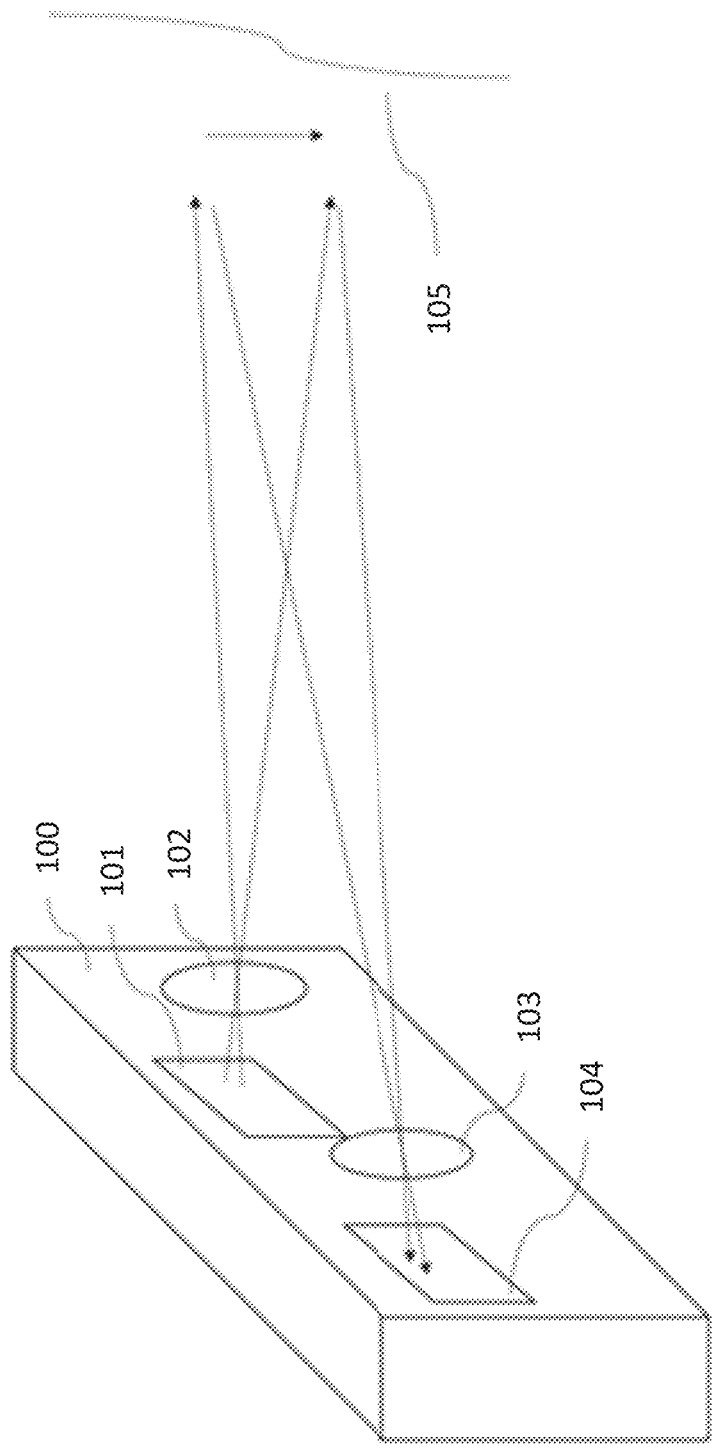
FIG. 1 shows a separate transmitter and receiver configuration for a LiDAR based coherent 3D imaging camera, according to some example embodiments.

Described below is an architecture of a LiDAR based 3D imaging system composed of a photonic integrated circuit (PIC) transmitter and a photonic integrated circuit receiver array. In accordance with some example embodiments, both the transmitter and the receiver are setup in a focal plane configuration, and both the receiver and the transmitter interface with optically with an environment via one or more lenses. The transmitter serves to generate an optical signal with a chirped optical frequency and to perform a two-axis scan of the optical beam over the region of interest. The receiver array serves to detect the difference in frequency between the return signal and a local copy of the signal (e.g., from a local oscillator (LO)) using coherent detection techniques for each pixel of the two dimensional array. In some example embodiments, all the transmitter functions are implemented on a first PIC and all functions of the receiver are implemented on a second PIC. An example embodiment is shown in FIG. 1. and briefly here to illustrate concepts and discussed in further detail below as well. In FIG. 1, an optical beam having a modulated optical frequency is directed perpendicular to the transmitter PIC 101 successively from a plurality of couplers on the surface of the PIC and the beam(s) are collimated by lens 102 to direct the light towards the region of interest 105 (e.g., a physical object for detection, ranging, etc.). The function of directing the beam to a plurality of couplers on the surface of the chip is accomplished by an in-plane optical switch, according to some example embodiments.

One or more objects in the region of interest 105 return the light as scattered signal which is then captured by lens 103 and directed to the plurality of pixels located on the surface of receiver PIC 104, where couplers direct the returned light into the plane of the chip. Once on the plane of the chip, the optical signal is combined with a copy of the local optical signal for each pixel of the receiver array and the frequency difference between the two signals is measured to determine ranging and distance information, according to some example embodiments.

Figure 6:
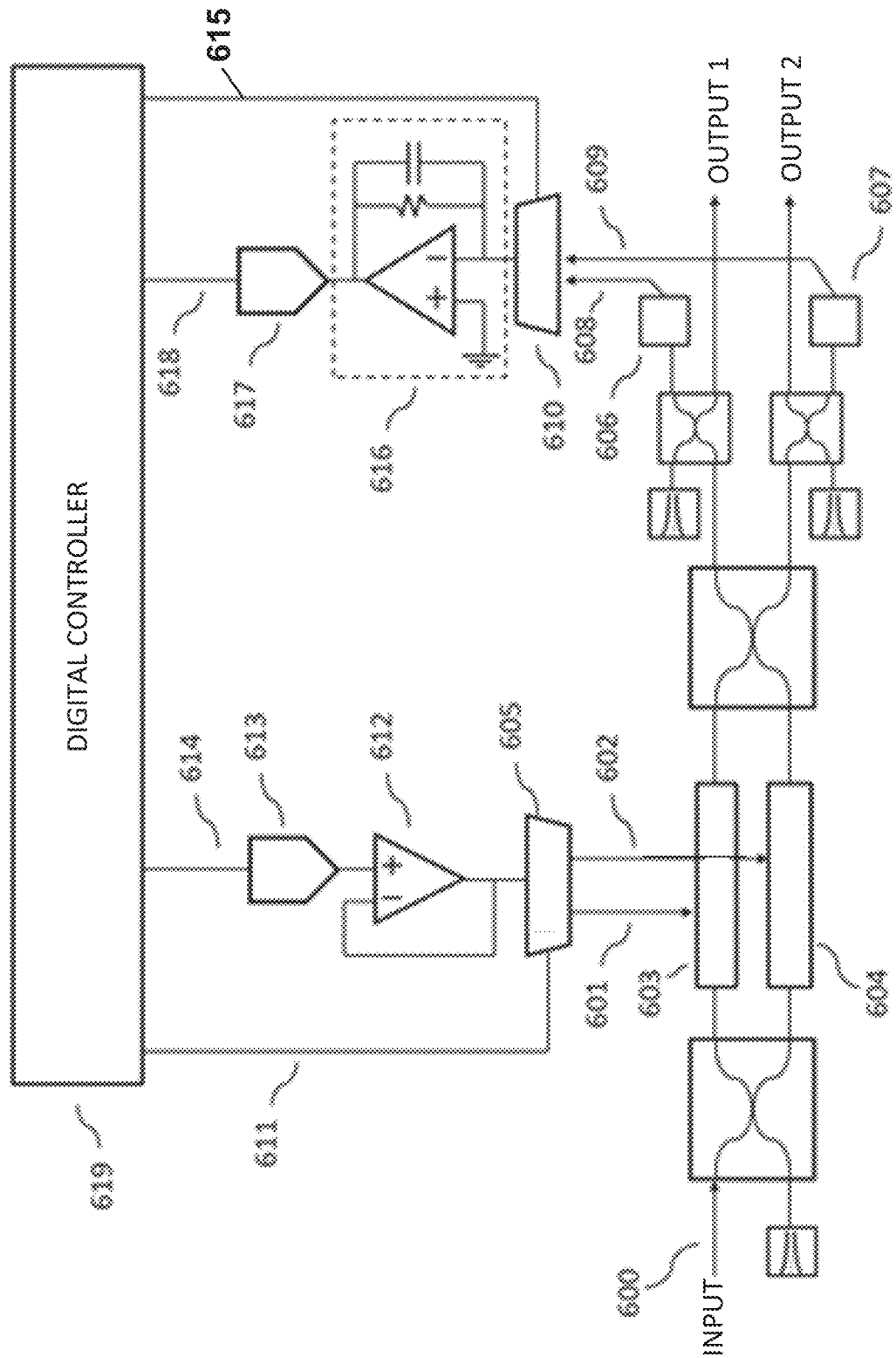
FIG. 6 shows a control of a thermo-optic switch, according to some example embodiments.

In some example embodiments, optical switches are integrated with electronic switches in the transmitter, as shown in FIG. 6, which is here briefly discussed and also discussed in further detail below. In the transmitter, the optical switch is integrated with the electronic switches on the same chip. Integration of the optical switch with electronic switches on the chip allows for efficient scaling to create large switch arrays, where otherwise the I/O requirements for such scaling would be prohibitive. Further, the integration of photodiodes into a tree of thermo-optic switches in the transmitter allows for the automatic detection and calibration of optical voltage/currents to drive transmitter heaters such that the extinction ratio is maximized for maximum delivery of optical power to the desired transmitter output port. The thermo integration also allows the system to correct for changes in ambient temperature, and other shifts that may affect switch operation of the chip. No special equipment is required, and transmitter calibration can be performed on the fly, even while a product is in operation. In addition, integration of several other electrical and optical functions into a single platform is described below.

On the receiver side, the circuit architectural design of array-based LiDAR coherent receivers can include integrated electronics for amplification and multiplexing. In this approach, each pixel in the array is a separate coherent receiver. Focusing is provided by a lens for which the receive array lies at the focal plane. The receiver circuit architectural design provides a modular and scalable approach to design large arrays of pixels. The modular block size is determined by the number of pixels able to efficiently receive the LO signal, the optical efficiency in illuminating the block with the reflected signal in terms of lens design and transmit power, and the number of parallel readout channels supported by the system signal processing cap ability.

The receiver architecture includes circuit strategies for amplification and multiplexing to effectively generate multiple parallel readout channels. For very large arrays, additional amplifiers can be added between groupings of modular blocks in order to maintain high-speed operation over physically long metal routes and the associated parasitic capacitance.

This readout array design does not preclude a one-to-many approach to illumination; for systems in which the transmit power is not a limitation such that hardware can be simplified by illuminating a larger subset of the scene in each time division than can be detected and processed by the receiver. In those embodiments, the transmitter switches are at an integer multiple of the receiver time division where the integer is determined by the ratio of scene subset illumination areas.

In this way, a solid state 3D imaging device exhibiting high performance can be implemented (e.g., high resolution, large number of pixels per frame, high frame rate and low form factor and power); in a nutshell a LiDAR system that functions as "camera like" device that provides a point cloud and also a velocity map (e.g., for each pixel) instead of mere grey scale images. Circuit architecture of a lensed focal-plane array of coherent detectors has not previously been solved in a compact, modular, and scalable manner.

The architecture described here provides a modular, scalable approach to readout circuit architecture design that can be integrated in lensed focal-plane array of coherent detectors, regardless of number of pixels, aspect ratio, and number of readout channels. The transmitter side the architecture described here provides a modular, scalable approach to building large scale switching arrays necessary for efficient 2 axis solid state beam scanning. At the system level, the integrated architectures presented both on the transmitter and receiver side enable the scaling necessary to achieve a new class of 3D imaging devices with never before achieved performance on a low cost platform that can easily be deployed into high volume production.

Different approaches can be implemented for 3D imaging systems using Frequency Modulation Continuous Wave (FMCW) LiDAR ranging. Generally, the approaches include a transmitter source that generates a frequency modulated signal, a steering mechanism to scan the beam across the target area and a receiver or plurality of receivers. Different mechanical beam scanning systems can be implemented in combinations of serial and parallel transmit/receive configurations. The number of parallel channels being used is typically in the few tens due to practical implementation considerations and the cost constraints that come from a discrete parts built system. In some example embodiments, a solid state architecture can be implemented for FMCW ranging using a phased array approach for steering. The electronically-controllable phased array approach focuses light across the target and then the reflected signal is mapped back into the detector. The difference from an optical phased array to the lensed focal-plane array is that in the former the optical signal is received by the entire array and combined in the on-chip photonics to produce a single pixel of information. In the latter approach, each receive pixel corresponds to a pixel of information from the target. Thus, the entire array of gratings is not necessarily illuminated by the reflected light. Instead, since typically only a portion of the target is illuminated at one time, the receiving lens provides focus of the reflected light onto only a subset of the receive array.

In this manner the scene is illuminated and recorded in a time-multiplexed manner. Each subset of the scene is typically illuminated for tens of microseconds (µs), but can be shortened to as a little as 1 µs, or a longer integration time, up to milliseconds or seconds, can be used to be achieve better resolution.

In the phased array approach, time-division multiplexing still occurs but due to the fact that the light is point-by-point steered to the target and received from each reflected target point. The entire phased array is active, with a signal combination in the photonic or electrical domain before a single detector is used to convert from the optical to electrical domain. Thus, the readout circuitry architecture and design tradeoffs are fundamentally different. This means that the light is first transmitted through the phased array and then received back through the same system, doubling the dB-loss of the optical signal path.

For multi-pixel readout systems (e.g. line arrays on mechanically rotating assemblies), each pixel is dedicated to a readout channel, or multiplexed to a small number of readout channels with a low multiplexing ratio (e.g. 2, 4). This leads to a simplified circuit architecture with fundamentally different requirements. Example uses include general 3D imaging such as LiDAR applications (e.g. autonomous vehicles or mapping) where high resolution and frame rate and thus multiple channel output is necessary.

Additionally, the system here can be augmented to include one or more of the following mechanisms: (1) Passive multiplexing in each pixel, instead of active amplification with in-built multiplexing via a high impedance output state, (2) Passive multiplexing at the pixel group level instead of active amplification with in-built multiplexing via a high impedance output state, and (3) Per pixel readout with single-channel operation.

The below description is discussed with reference to the reference numerals in the figures. With reference to FIG. 1, a LiDAR based 3D imaging system 100 comprises a photonic integrated circuit (PIC) 101 transmitter and a photonic integrated circuit receiver 104, according to some example embodiments. Both the transmitter and the receiver are set up in a focal plane configuration each imaged with the help of a lens. The transmitter serves to generate an optical signal with a chirped optical frequency and to perform a two-axis scan of the optical beam over the region of interest. The receiver array serves to detect the difference in frequency between the return signal and a local copy of the signal using coherent detection techniques for each pixel of the two dimensional array. In one implementation all the transmitter functions are implemented on one PIC and all functions of the receiver are implemented on a second PIC. A sample architecture is shown in FIG. 1—an optical beam having a modulated optical frequency is directed perpendicular to the transmitter PIC 101 successively from a plurality of couplers on the surface of the PIC and collimated with the help of lens 102 and directed towards the region of interest 105. The function of directing the beam to a plurality of couplers on the surface of the chip is accomplished by an in-plane optical switch. The scattered signal from region of interest 105 is captured by lens 103 and directed to the plurality of pixels located on the surface of receiver PIC 104 where couplers direct the light into the plane of the chip. Once on the plane of the chip the optical signal is combined with a copy of the local optical signal for each pixel of the receiver array and the frequency difference between the two signals is measured.

In one implementation illustrated in FIG. 2, the transmitter 201 is monolithically or hybrid-ly integrated into a single PIC and has the following architecture. A laser source 202 with high coherence is used to provide laser light with fixed optical frequency that is controlled by an electrical laser driver 206. The fixed frequency laser signal is coupled into the input of an in-phase quadrature (IQ) modulator 203. A chirped frequency electrical signal generated by the waveform generator and amplifier 207 is used to drive the in-phase IQ modulator 203 and convert the input fixed frequency optical signal into a chirped frequency optical signal, more specifically an optical signal whose frequency changes from f1 to f2 during a time interval t. The chirped frequency optical signal from the output of the in-phase IQ modulator 203 is passed through the optical amplifier 204 powered by amplifier driver 208, in order to be amplified. The optical amplifier 204 may be a semiconductor optical amplifier or a fiber amplifier. The output of the optical amplifier 204 serves as input for the optical beam scanner 205. The optical beam scanner 205 has a beam scanning electronic driver 209 associated with it. In one implementation, the optical beam scanner 205 and the beam scanning electronic driver 209 are monolithically integrated on the same optoelectronic chip. In one embodiment, the electrical chirp generator, the electrical signal amplifier and the in-phase IQ modulator 203 are monolithically integrated on a single chip. In one embodiment, the integration takes place using a silicon on insulator material system or another semiconductor material system. In one embodiment, the fixed frequency laser die is integrated with the electrical chirp generator, the electrical signal amplifier and the in phase quadrature optical modulator using a hybrid approach in which a trench to accommodate the laser is etched into the monolithic silicon on insulator platform.

In one embodiment, the electrical chirp generator, the electrical signal amplifier for the modulator drive signal, the in phase quadrature optical modulator, the optical switch network used to scan the optical beam in two dimensions and the driver electronics for the optical switch network are all monolithically integrated on the same chip. In one embodiment, the integration platform is a silicon on insulator platform. In one embodiment, the integration platform contains a semiconductor material. In one embodiment, the fixed frequency laser chip and an optical amplifier 204 or plurality of optical amplifiers are integrated using a hybrid approach on the same chip as the monolithically integrated electrical chirp generator, the electrical signal amplifier for the modulator drive signal, the in phase quadrature optical modulator, the optical switch network used to scan the optical beam in two dimensions towards objects in the environment via a lens 202. The hybrid integration is achieved using a trench etched into the silicon on insulator platform and the laser and amplifier dies placed into the trench. In one embodiment, the integration platform contains a semiconductor material.

Figure 2A:
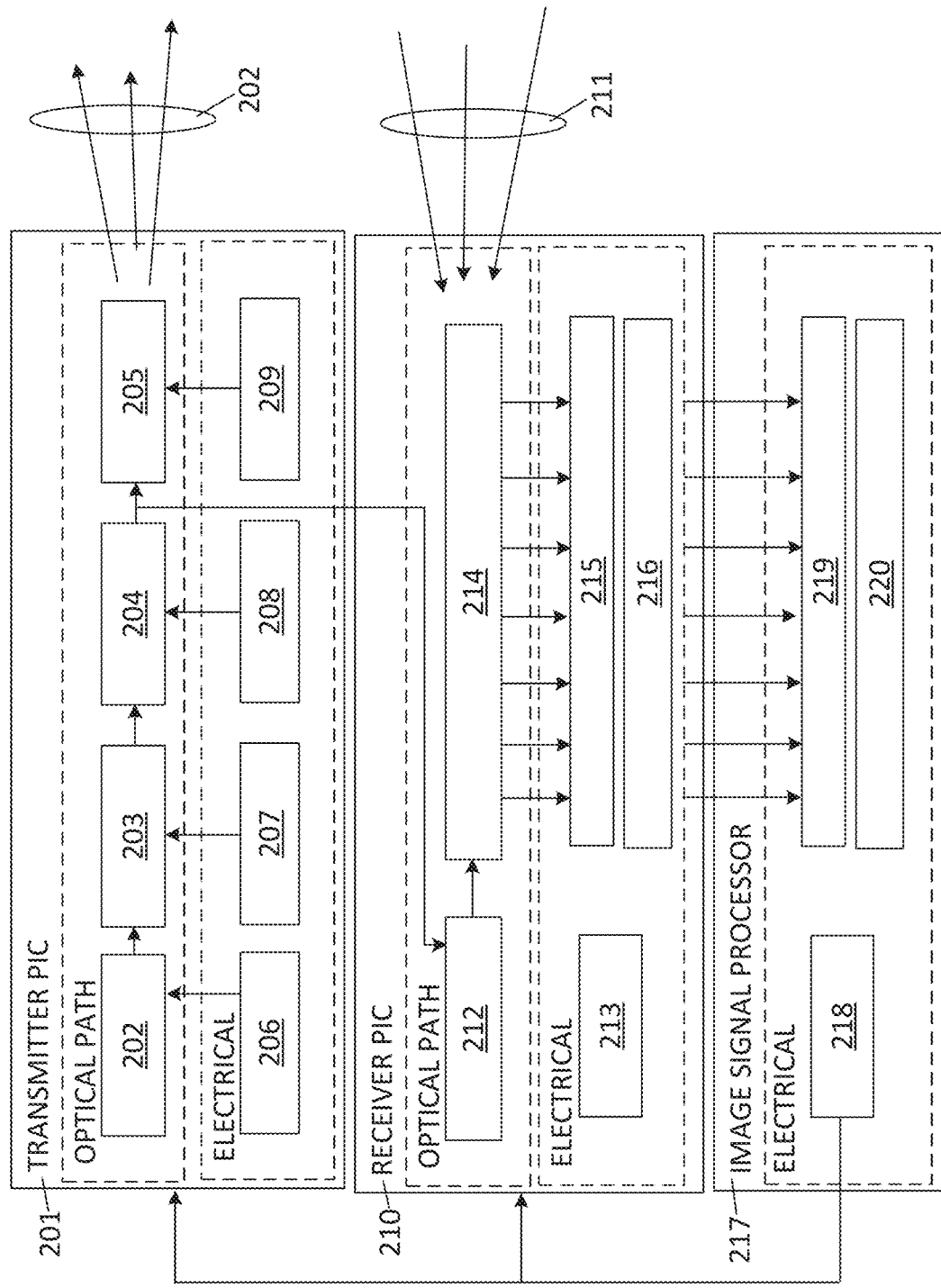
FIG. 2A shows a block diagram of transmitter, receiver, and signal processor for a LiDAR based coherent 3D imaging camera for a separate outbound and inbound path configuration, according to some example embodiments.

In one implementation illustrated in FIG. 2A, the coherent receiver array is monolithically or hybridly integrated into a single PIC. The coherent receiver PIC 210 is composed of an array of pixels 214 to receive light reflected from the environment that is collected by a lens 211. Each pixel of the array of pixels 214 composed of an optical coupler to couple light incident on the chip in the plane of the chip, a 2×2 optical coupler/multiplexer to combine light received from the target with a local oscillator and a coherent detector, an optical local oscillator switch network 212 driven by the switch driver 213, a readout amplification stage (e.g., in the readout and amplification stages 215) and an analog interface 216. In one embodiment, the optical local oscillator switch network 212, the switch driver 213, the array of pixels 214 (e.g., array of balanced coherent detector elements), the readout and amplification stages 215, and the analog interface 216 are all monolithically integrated on the same chip. In one embodiment, the integration platform used is silicon on insulator. In one embodiment, the integration platform contains a semiconductor material. A subsegment of the frequency modulated optical signal is split after the optical amplifier 204 and directed to the optical local oscillator switch network 212 to provide local oscillator optical signal for the array of pixels containing coherent detectors.

The light scattered from the region of interest is collimated by and directed on one of the pixels containing coherent detectors that compose the array of pixels 214. The return optical signal is combined with local oscillator optical signal. The resulting optical signal modulated at the frequency of the difference between the two optical signals is converted into the electrical domain by the photodetectors. The electrical signal is directed to the readout and amplification stages 215 and subsequently to the analog interface 216 to the image signal processor 217. The image signal processor 217 SoC contains a control and synchronization section 218 which synchronizes the functions of the transmitter and receiver PICs and analog to digital conversion section 219 which converts the analog electrical signal into a digital signal and a digital signal processing section 220 which performs the FFT on the signal and extracts the signal frequency.

Each coherent detector pixel contains at least a grating and a detector. In this case, the pixel contains two detectors for balanced detection allowing rejection of local oscillator (LO) imperfections. The pixel receives two light signals: one is reflected light from the target that couples into the grating, and the other from the LO signal which was split into a piece that remains local and a piece that was sent to the target.

Figure 2B:
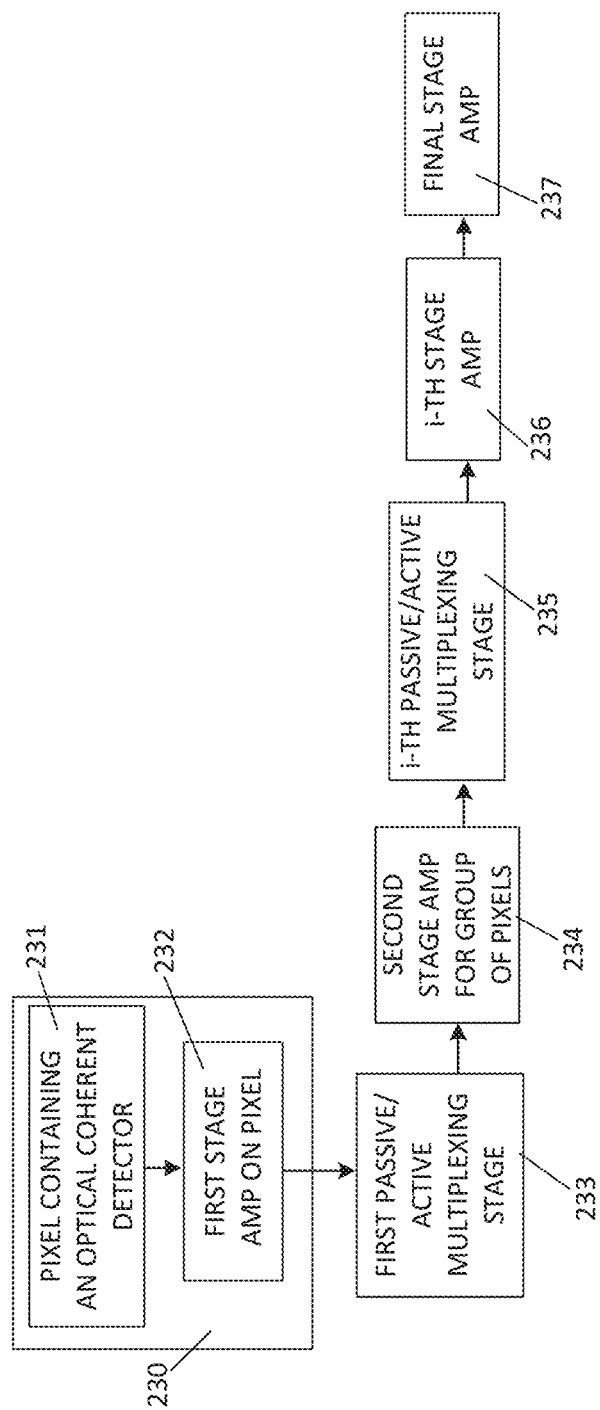
FIG. 2B shows example on chip signal processing stages, according to some example embodiments.

In one embodiment shown in FIG. 2B, the signal chain for the signal from each pixel is composed of pixel 230 containing the coherent detector 231 and the on pixel first amplifier stage 232. Next the signal is routed to the first passive or active multiplexing stage 233 then to the second amplifier stage 234 serving a group of pixels and then further to the ith passive or active multiplexer stage 235 then to the ith stage amplifier 236. The chain ends with the last amplifier stage 237 which provides enough signal to drive the signal off the chip through the analog interface 216 to the image signal processor 217.

Figure 2C:
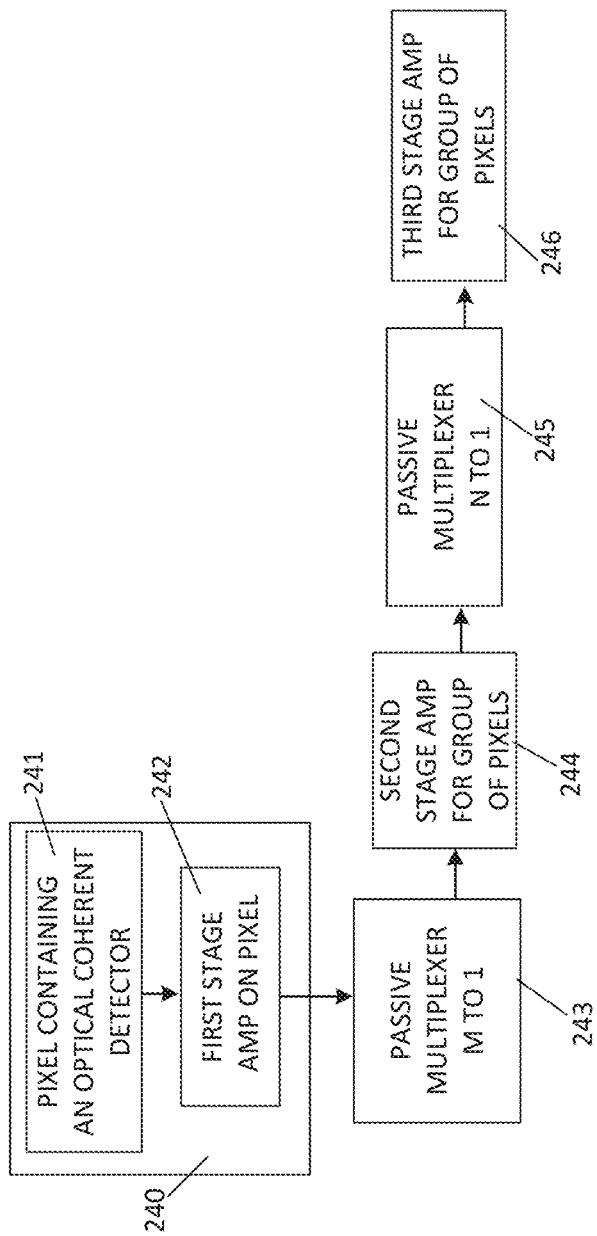
FIG. 2C shows example on chip signal processing stages using passive multiplexers, according to some example embodiments.
Figure 3:
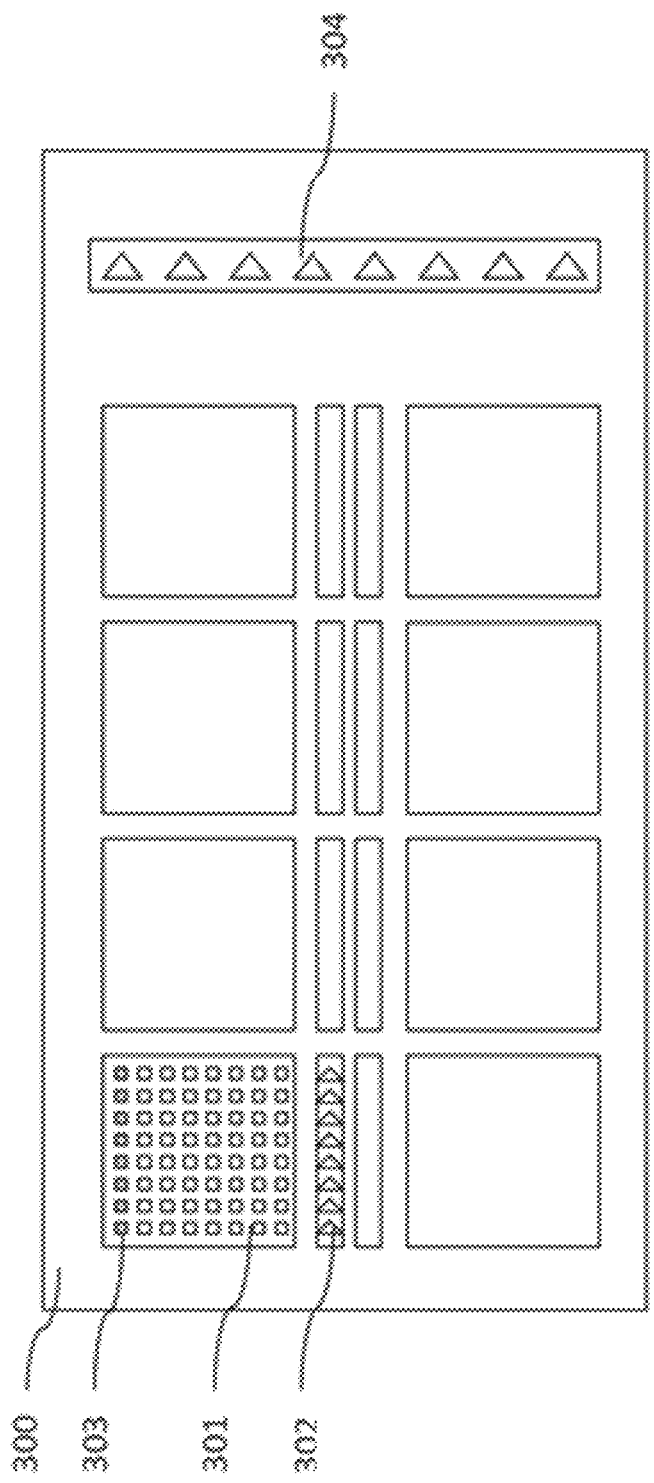
FIG. 3 shows a chip level architecture for amplification and multiplexing of signals from a pixel array—linear readout configuration, according to some example embodiments.

FIG. 2C. shows one embodiment of the signal chain corresponding to the array architecture described in FIG. 3. In one embodiment, the optical signal is converted into an electrical signal by coherent detector 241 being part of pixel 240. The electrical signal is amplified by on pixel first stage amplifier 242. Then passive multiplexer 243 multiplexes M signals into one and the resulting signal is amplified by second stage amplifier 244, followed by another passive multiplexing stage 245 and the final amplification stage 246.

Figure 2D:
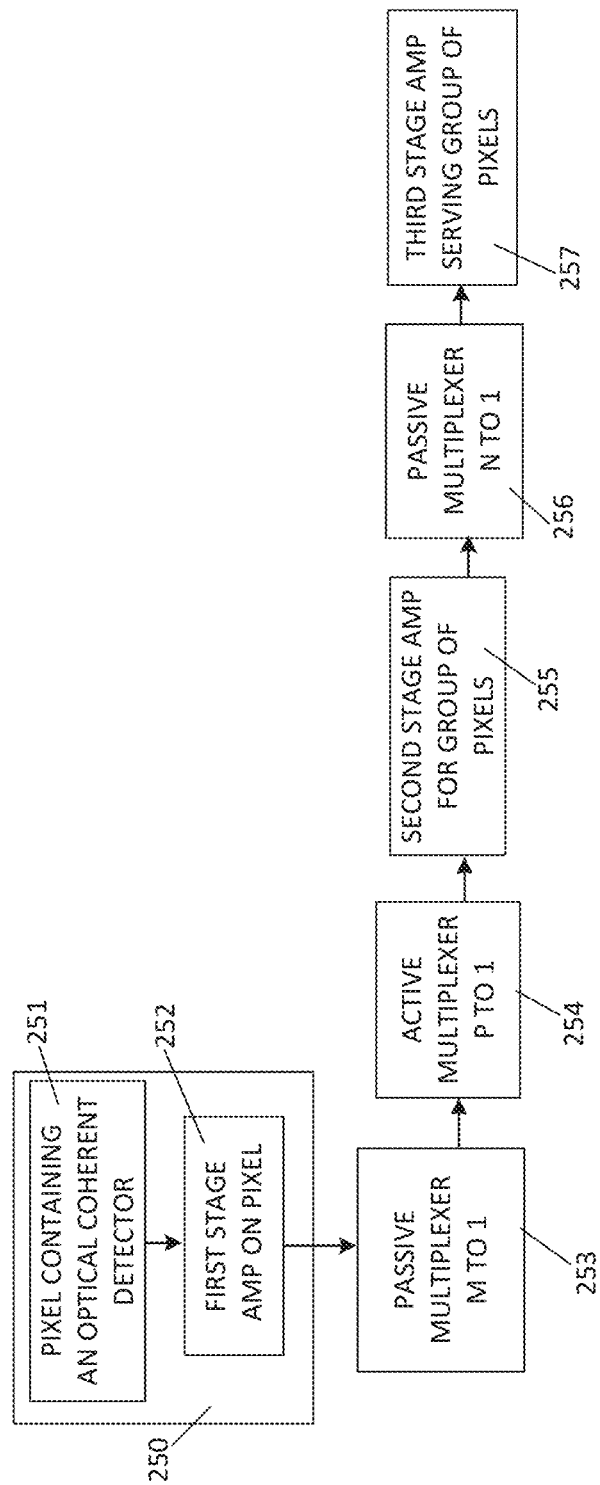
FIG. 2D shows on chip signal processing stages using active multiplexers, according to some example embodiments.
Figure 4:
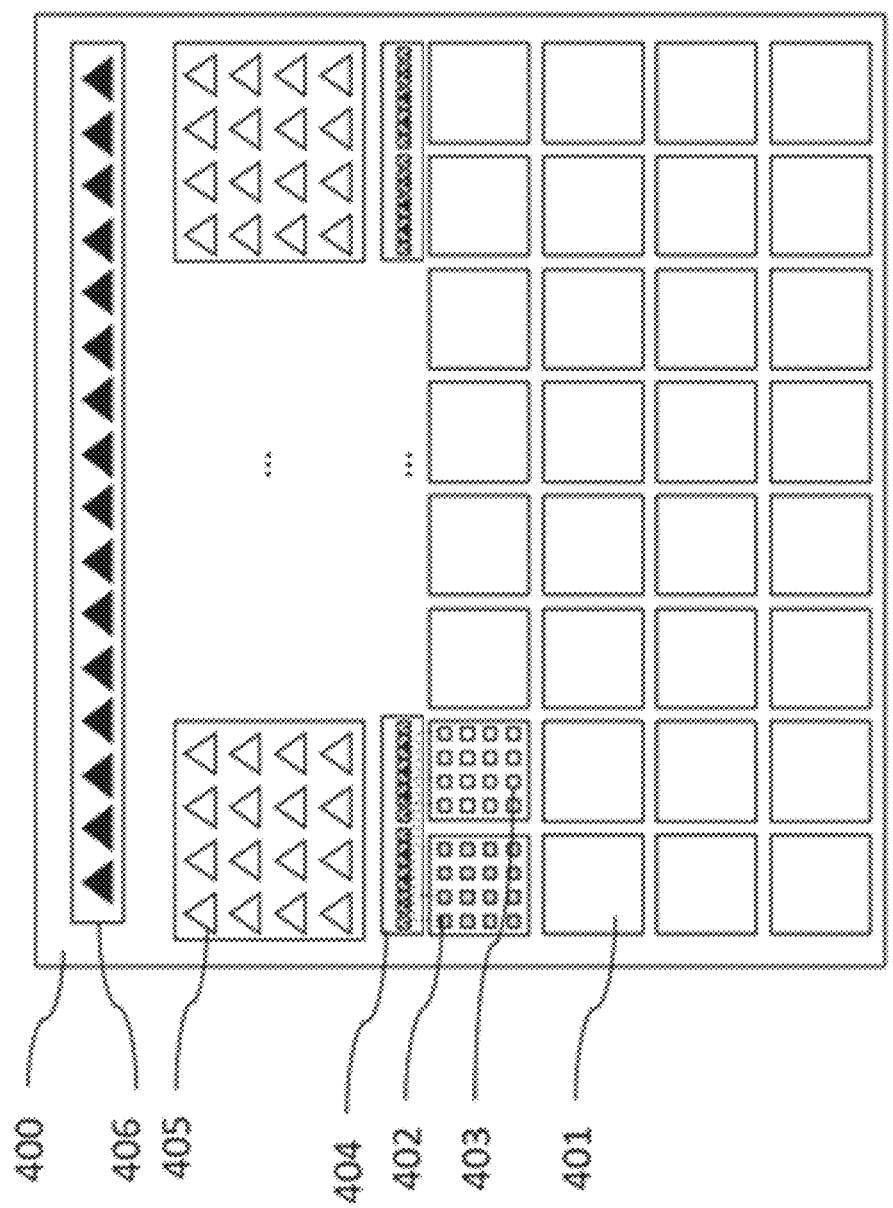
FIG. 4 shows a chip level architecture for amplification and multiplexing of signals from a pixel array—matrix readout configuration, according to some example embodiments.

FIG. 2D shows one embodiment of the signal chain corresponding to the array architecture described in FIG. 4. In one embodiment, the optical signal is converted into an electrical signal by coherent detector 251 being part of pixel 250. The electrical signal is amplified by on pixel first stage amplifier 252. Then passive multiplexer 253 multiplexes M signals into one and the resulting signals are further multiplexed by the active multiplexer 254 each P signals into 1. The resulting signals are each amplified by second stage amplifier 255, followed by another passive multiplexing stage 256, and the final amplification stage 257.

With the lensed focal-plane array system design framework, frame rate is maximized by reading out multiple illuminated pixels in the array in each time period. The pixel grouping can be arranged as a typical electronic array with active rows and shared column readout electronics (M×1 aspect ratio), or optimized for optical efficiency and arranged with multiple columns and rows as a rectangle (M×N aspect ratio). In the latter arrangement, the readout circuitry is arranged in stacked groups such that N readout circuits are used per column. By further extending the detection time period P cycles, readout circuitry multiplexing can save area by N/P. For example, sharing readout circuits between two columns is enabled by doubling the detection time per group and multiplexing two columns of pixels to one circuit.

In order to achieve high signal-to-noise ratio (SNR) and provide sufficient signal strength to the ADC, active amplification is required. Combining the amplification with multiplexing saves area, power, and improves isolation across multiplexed on and off pixels. Multiplexing can be inherently provided by directly tying together multiple pixel outputs, where in each time division one of the pixels is active while the rest are inactive, and the amplifier is designed to provide a high-impedance output when inactive.

In one embodiment, an M×1 aspect ratio configuration is used. In this embodiment, a first-stage amplifier is provided within each pixel. Outputs of each pixel column are directly tied together and connected to a second-stage amplifier acting as the column readout circuit. Tri-stated high-impedance outputs of inactive first-stage amplifiers allow multiplexing set by enable signals sent to each row of pixels. Columns are grouped by illuminated area, so that for each time division only a set number of columns are read. Multiplexing of the multiple column groups similarly shares output connections to a third-stage amplifier, which acts as the pad driver to get the signal off the chip or into the ADC. In this arrangement there are M parallel readout channels.

In one embodiment, a 512-pixel array 300 could be arranged in 8 groups of 64 pixels 301 as illustrated in FIG. 3, each pixel having its own amplifier. In one embodiment, each of the 8 groups of 64 pixels is organized as an 8×8 pixel array. Each group can read out an 8×1 row of pixels 303 in one time division. 8 second-stage amplifiers 302 are provided per group, and the 8 groups of second-stage amplifiers 302 share outputs to drive the 8 third-stage amplifiers 304, such that in each time division only one group of second-stage amplifiers 302 is actively driving the third-stage amplifiers 304. Therefore, in one time division, a single 8×1 row of pixels 303 is active, with the corresponding 8 second-stage amplifiers 302 active, driving the 8 third-stage amplifiers 304 which are all active.

The other 7 rows of the pixel block, as well as the other 7 64-pixel blocks are inactive. The number of pixels in the array 300 can vary from 16 pixels to 4 million pixels. The array may be divided into different numbers of groups of pixels such as from 16 pixels to 1 million pixels. The number of pixels to be read simultaneously in one time division may be from 1 pixel so that all pixels are read serially to a large scale parallel readout of 512 or 1024 pixels being read simultaneously in parallel in one time division. The number of second stage amplifiers may be from 1 amplifier to 256 thousand amplifiers and the number of third stage amplifiers may be from 1 amplifier for a serial case to 512 or 1024 third stage amplifiers for highly parallel readout architecture.

In one embodiment, M×N pixels are simultaneously read in for each time division. In the M×N aspect ratio scenario, for the pixels to be simultaneously read, a first-stage amplifier is provided within each pixel. N outputs of each pixel column can connect into N second-stage amplifiers 302. For the M×N pixel groupings across the array, column groups share the N outputs of each pixel column by directly connecting into the M second-stage amplifiers 302 of that column. The inactive outputs present tri-stated high impedance outputs allowing direct bus connection for the second-stage amplifier inputs. The M×N outputs feed a total of M×N third-stage amplifiers, which are shared across the pixel groupings, to amplify the signal and drive the output pads or ADC input in a parallel readout fashion. In this arrangement there are M×N parallel readout channels.

In one embodiment, a 512-pixel array is arranged to illuminate and readout 4×4 groups of pixels for 16 parallel channels read every time division. The array of pixels 401 on chip can be split into 32 groups of 16 pixels. As illustrated, the array of pixels 401 is arranged in 8 columns of 4 rows, each of the 32 containing 16 pixels, in accordance with some example embodiments. A group of 16 active 2:1 multiplexers is used to switch between pairs of pixels belonging to the block of 16 pixels (e.g., pixel group 402 and 403 respectively). The 16 2:1 multiplexers are connected to 16 second stage amplifiers. For the entire array, the output of the 64 active multiplexers 254 are connected by connectors 404 to 64 second-stage amplifiers 405 which are then passively multiplexed into 16 third stage amplifiers 406. This allows us to multiplex from 128 pixels to 16 outputs. The active 2:1 multiplexers across pixel group columns reduce the number of second-stage amplifiers 405 by a factor of 2, as well as reducing cross-talk compared to passive multiplexing. The second-stage amplifiers 405 are shared across 8 pixel groups 402 and 403 to drive 16 third-stage amplifiers and the data readout. In time division, one group of 16 pixels is active, with the pixel group column sharing multiplexers set to select that particular pixel group column, and high-impedance outputs of the first-stage amplifiers of the inactive pixel groups in that same column enable passive multiplexing to the second-stage amplifiers 405. The 16 second-stage amplifiers 405 are active, while the other 48 are inactive enabling passive multiplexing to the 16 third-stage amplifiers. Thus, 16 pixels in the array are active and selected for readout of the 16 data channels.

The number of pixels in the array 400 can vary from 16 pixels to 4 million pixels. The array may be divided into different numbers of groups of pixels such as from 16 pixels to 1 million pixels. The number of pixels to be read simultaneously in one time division may be from 1 pixel so that all pixels are read serially to a large scale parallel readout of 512 or 1024 pixels being read simultaneously in parallel in one time division. The number of second stage amplifiers may be from 1 amplifier to 256 thousand amplifiers and the number of third stage amplifiers 406 may be from 1 amplifier for a serial case to 512 or 1024 third stage amplifiers 406 for highly parallel readout architecture.

Figure 5:
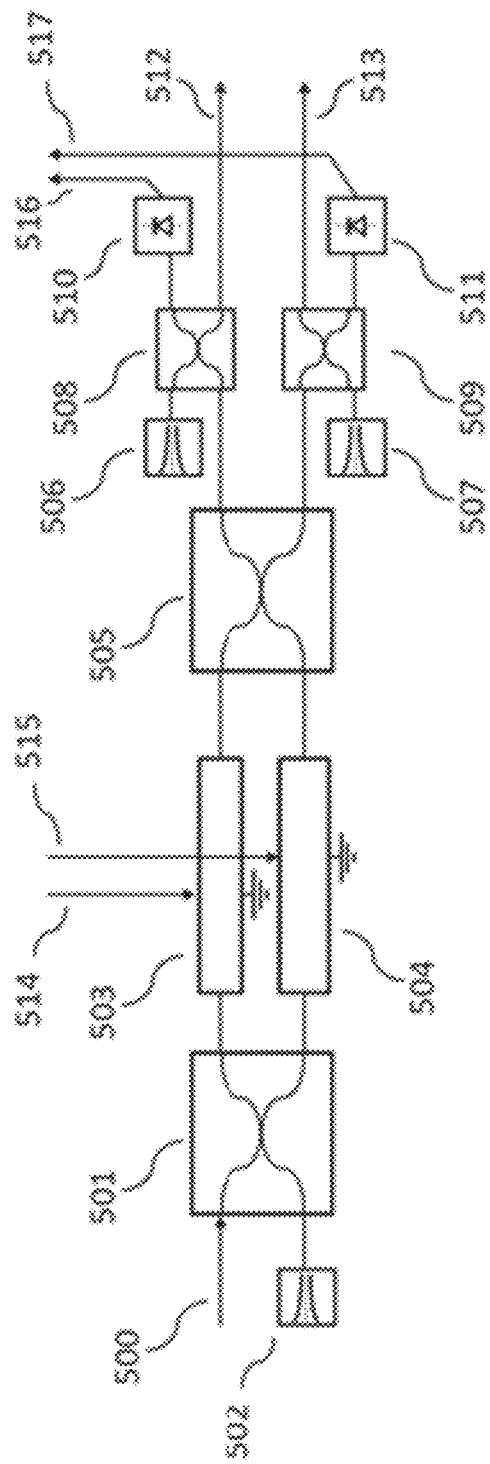
FIG. 5 shows a 1:2 thermo-optic switch with integrated photodiodes, according to some example embodiments.

FIG. 5 shows an example thermo-optic switch PIC architecture, according to some example embodiments. One embodiment of a thermo-optic switch consists of the optical input signal 500 going into a 50-50 splitter 501 (e.g., a 2×2 coupler with one of the inputs unused or connected to an absorber 502). A thermal phase shifter (TPS) 503 and 504 can be placed on each arm capable of at least $\pi/2$ phase shift each, or a single TPS one arm capable of $\pi$ phase shift. Utilizing a TPS on each arm allows a more compact and lower power design. Each TPS can receive an electrical power signal (e.g., drive signal 514, drive signal 515) to control the phase shift through the TPS. Another 2×2 coupler 505 follows, leading to the optical outputs 512 and 513. Before the output, the signal can be sensed using asymmetric couplers 508 and 509 which would tap 1-5% of the output signal to the sensing photodiodes 510 and 511. The unused port of the asymmetric couplers 508 and 509 are connected to optical absorbers 506 and 507. Each photodiode generates an electrical signal (e.g., electrical photocurrent signal 516, electrical photocurrent signal 517) which can be sensed by a control circuit.

In some example embodiments, maximizing the extinction ratio of a thermo-optic switch includes driving one or both of the electrical drive signals 514 and 515, and monitoring the photocurrent signals (e.g., electrical photocurrent signal 516, electrical photocurrent signal 517) generated in photodiodes 510 and 511, respectively, while an optical input signal 500 is present. By configuring the electrical input signals (e.g., drive signal 514, drive signal 515) to drive output signals (e.g., electrical photocurrent signal 516, electrical photocurrent signal 517) to either a minimum or maximum, the extinction of the ratio of the thermo-optic switch can be maximized. A feedback control loop which generates the drive signal 514 and the drive signal 515 and senses output signals (e.g., electrical photocurrent signal 516, electrical photocurrent signal 517) to maximize the extinction ratio can be implemented in a variety of ways but utilizes information from these input and output signals. Subsets of these signals can also enable maximization of the extinction ratio; for example, one embodiment may drive a single TPS on one of the thermo-optic switch, and observe both, one, or neither of the output photocurrents. In the case of neither, one embodiment would directly observe one or both of the optical outputs 512 and 513. Feedback control is accomplished by observing and maximizing photocurrent of the desired output, or minimizing the photocurrent of the undesired output. For example, if optical output 512 is to be maximized, drive signal 514 and drive signal 515 are configured such that either the electrical photocurrent signal 516 is maximized or the electrical photocurrent signal 517 is minimized, or the ratio of the two is maximized.

One embodiment of a thermo-optic switch control is shown in FIG. 6. With an optical input 600 present, the phase shifters 603 and 604 can be driven by the outputs 601 and 602 of a demultiplexer 605. For an embodiment with a single TPS arm the demultiplexer 605 would not be used, requiring more power to reach a total n phase shift in a single TPS but reducing the circuit and control complexity. The power into demultiplexer 605 is determined using the photocurrents 608 and 609 from the photodiodes 606 and 607. In this embodiment, the photocurrents 608 and 609 are inputs to the multiplexer 610 ("Mux"); in other embodiments, the multiplexer 610 may be removed and both photocurrents 608 and 609 kept along separate signal paths. The multiplexer 610 output may then be amplified by a circuit such as a transimpedance amplifier (TIA) 616, or may go directly into the next stage, which is the analog-to-digital converter (ADC) 617 to convert the analog signal into a digital code 618 to be used by the Digital Controller 619 (e.g., an electrical control circuit, microcontroller, a processor with memory that when executed by the processor perform stored instructions). In other embodiments, the analog signal can be directly processed by a feedback circuit to generate the appropriate driving signal, removing the need for a Digital Controller 619. In this embodiment, the Digital Controller 619 takes in the digital code 618 and, based on configurable software program or hard-coded logic, determines the appropriate digital output code 614 to send to the digital-to-analog-converter 613, and the select signal 611 and 615 for the demultiplexer 605 and multiplexer 610, respectively. The DAC 613 output is buffered via amplifier 612 in order to drive sufficient electrical power to the selected phase shifter, and the demultiplexer 605 must be sized appropriately to pass high power levels. The Digital Controller 619 can find the settings for maximum extinction ratio by using, for example, a brute force method 700 (FIG. 7) to sweep all possible settings. The resulting settings for the maximum and minimum extinction ratios are the settings to switch optical power to either output 1 or 2.

Figure 7:
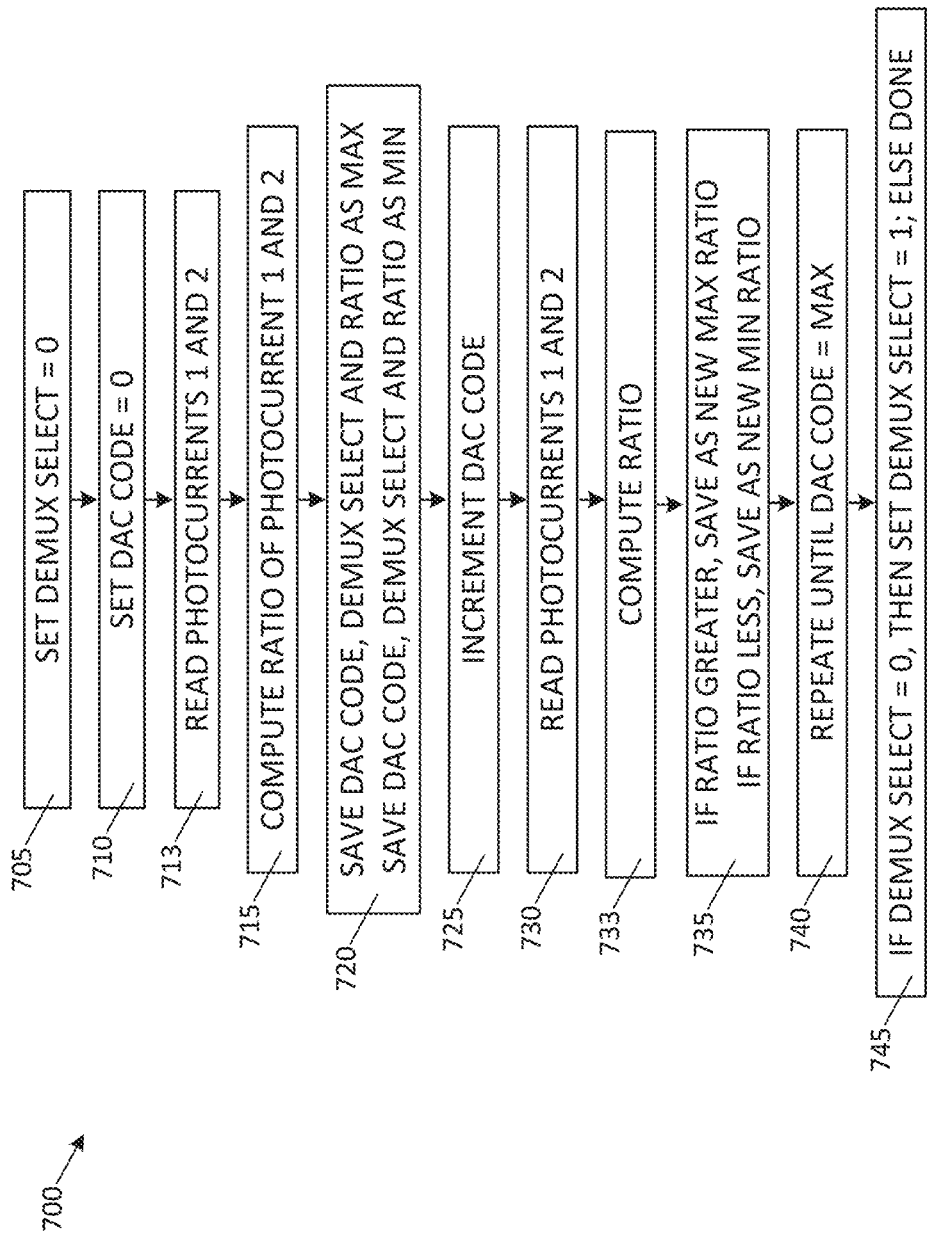
FIG. 7 shows flow diagram to determine maximum extinction ratio for a thermo-optic switch, according to some example embodiments.

With reference to the method 700 of FIG. 7, at operation 705 the demultiplexer select is set to zero (e.g., or an initial or first most value). At operation 710, the DAC code is set to zero (e.g., or an initial or first most value). At operation 713, the first and second photocurrents from the taps are read (e.g., from photodiodes 606, and 607). At operation 715, the ratio of the photocurrents is generated by the digital controller 619. At operation 720, the DAC code of operation 710, the demultiplexer select setting of operation 705 and the photocurrent ratio of operation 715 are saved as the max and min values. At operation 725, the DAC code is incremented to its next available value. At operation 730, the photocurrents are read and their ratio is computed at operation 733. At operation 735 the new ratio computed at operation 733 is greater than the previously computed max ratio, then the new DAC code and the new ratio is saved as the new max ratio. Further, if the new ratio is less than the previous min ratio, then the new DAC code and new ratio is saved as new min ratio at operation 735. At operation 740, the method iterates until all the available codes for the DAC are tested and the max DAC code is reached. At operation 745, if the demultiplexer select setting is set to zero, then the demultiplex select setting is changed to be set to one ("1"), otherwise (e.g., if the demultiplexer is not set to zero), the method ends and the stored values can be used at runtime. In some example embodiments, method 700 is performed at the manufacturing and calibration stage of the product having the PIC. Further, in some example embodiments, the method 700 is performed periodically (e.g., daily) or any time a new ambient temperature change is detected, or a threshold temperature is met (e.g., if the PIC heats up over 170 degrees on a hot summer day, or goes below a temperature due to a colder ambient environment).

Figure 8:
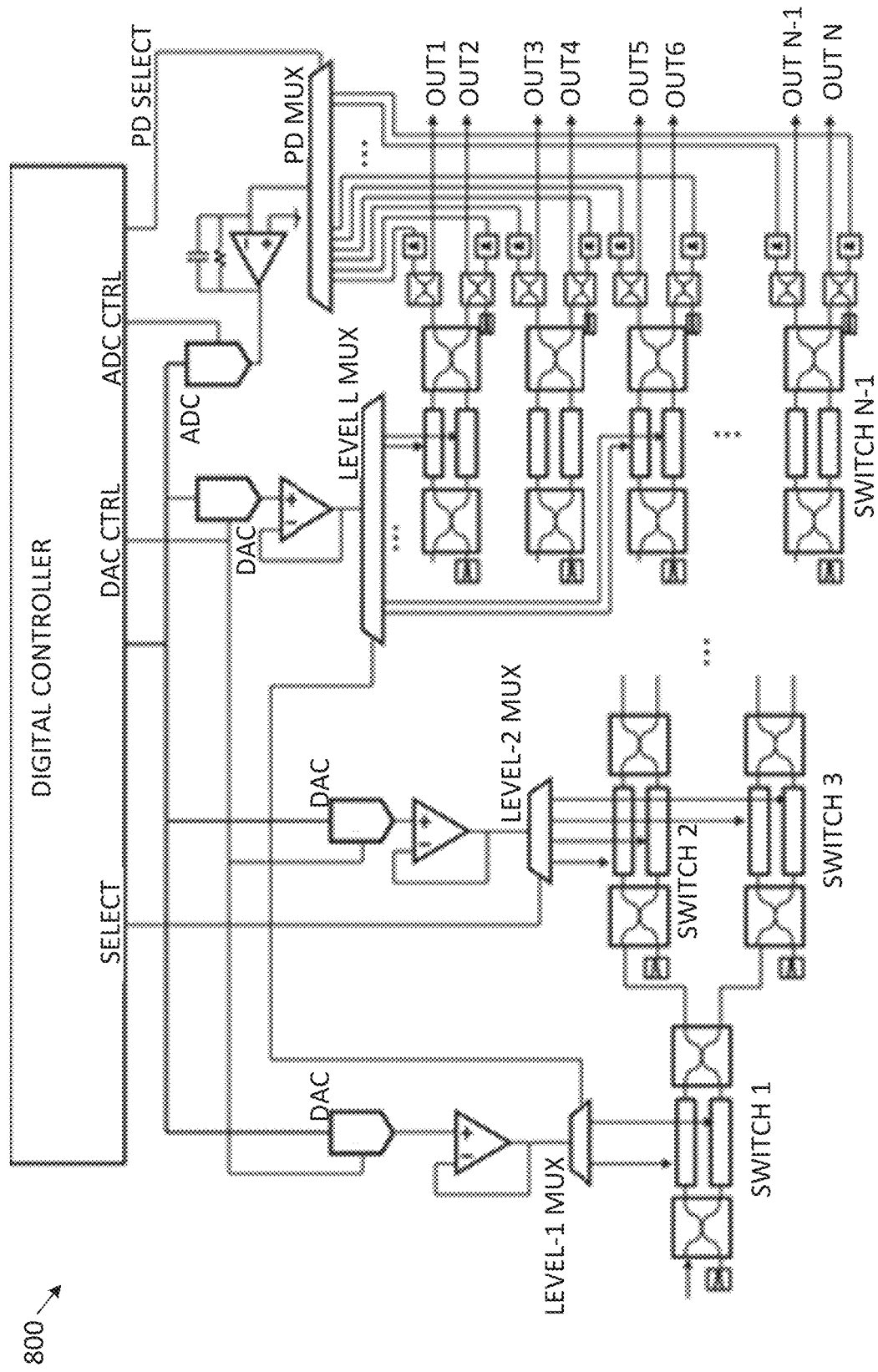
FIG. 8 shows a control system for a 1:N switch tree, with L levels, with photodiodes shown after the final level only, according to some example embodiments.

A switch tree of 1:N can be built by a tree of 1:2 thermo-optic switches, L levels deep, where $N=2^L$. The control and sensing circuitry can be independent per switch, or shared at each level of the tree. A sharing circuitry architecture 800 is illustrated in FIG. 8, according to some example embodiments. For example, a 4 level switch tree with N=16, consists of 1+2+4+8=N−1 switches. Each switch has 2 arms and can be controlled by either 1 or 2 heaters. A TO switch designed to operate with π phase shift with 1 heater can operate with fewer control interfaces, but has higher power and size requirements. For large N it is likely a 2-heater design is utilized, which requires 2(N−1) inputs to control the switch tree. Loss is proportional to L. for example, is we have −0.74 dB loss per switch, a 1:256 switch tree will expect −5.92 dB total loss In the example of FIG. 8, the photodiodes measure photocurrent levels at outputs only at the last tree level. To perform initial calibration of switch 1, the outputs of the upper arm and lower arm can be summed together to drive calibration. Once switch 1 is calibrated, in a similar manner the switches at the next level of the tree can then be calibrated by summing the appropriate total potential outputs from the switch being calibrated.

As N gets large, the number of I/O ports required to control the tree gets prohibitively large. For example, for N=128, there are 254 TPS inputs plus 128 PD outputs. By monolithically integrating the multiplexer and demultiplexer on the same die as the photonic components, the I/O requirements reduce significantly—7 parallel bits for TPS selection and 7 for PD selection. A serial I/O implementation can further reduce I/O requirements; for example, SPI requires 3 digital inputs and one digital output.

For an embodiment with monolithically integrated circuitry, the process technology introduces additional constraints to the design of the electronics and photonic components. For a modern CMOS process, the highest natively supported voltage is 3.3V. To simplify electronic design, constraining maximum voltage to the TO to 3.3V determines the effective resistance of the TO and the maximum current needed to get the requisite phase shift. Staying within the native 3.3V limit allows circuits such as the DAC 613, driver buffer, and demultiplexer 605 to be designed without additional complexity required to generate and support voltage signals higher than natively supported by the foundry process.

In one embodiment, the system described in FIG. 6 and FIG. 8 is implemented monolithically on a single chip. In this implementation, the number of I/Os is drastically reduced allowing therefore for virtually unlimited scaling for the size of the array of switches. In one embodiment, the material system used for monolithic integration is silicon. In one embodiment, the material system used for monolithic integration is a semiconductor.

Figure 9:
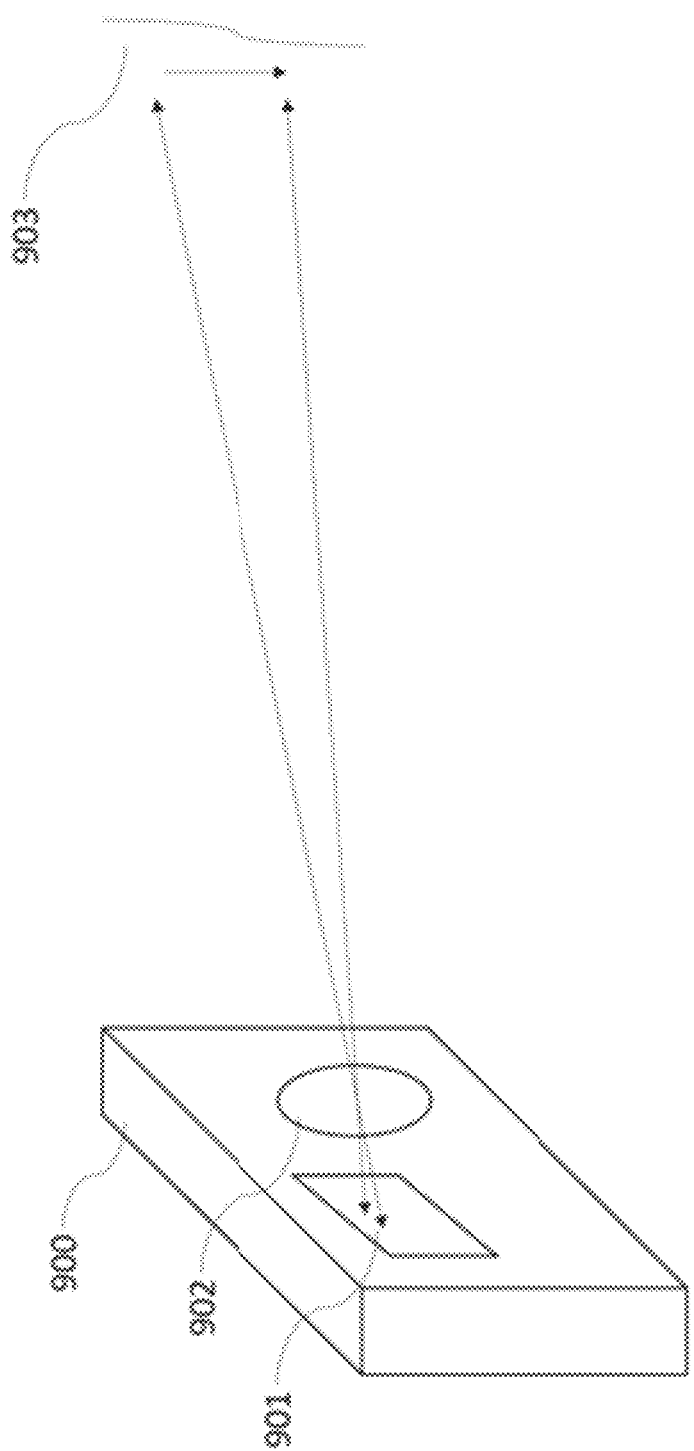
FIG. 9 shows a common transmitter/receiver path configuration for a LiDAR based coherent 3D imaging camera, according to some example embodiments.

In one implementation illustrated in FIG. 9, the architecture 900 of a LiDAR based 3D imaging system composed of a photonic integrated circuit (PIC) transceiver array. The transceiver array is set up in a focal plane configuration imaged with the help of a lens. The transmitter serves to generate an optical signal with a chirped optical frequency and to perform a two-axis scan of the optical beam over the region of interest. The receiver array which shares the grating couplers that couple the light in and out of the chip with the transmitter array serves to detect the difference in frequency between the return signal and a local copy of the signal using coherent detection techniques for each pixel of the two dimensional array. In one implementation, all the transmitter and the receiver functions are implemented on one PIC. A sample architecture is shown in FIG. 9.—an optical beam having a modulated optical frequency, frequency modulation created by PIC 901 is directed perpendicular to the transmitter portion of the PIC 901 successively from a plurality of couplers on the surface of the PIC and collimated with the help of lens 902 and directed towards the region of interest 903. The function of directing the beam to a plurality of couplers on the surface of the chip is accomplished by an in plane optical switch. The scattered signal from region of interest 903 is captured by lens 902 and directed to the plurality of pixels located on the surface of receiver of the PIC 901 where couplers direct the light back into the plane of the chip. Once in the plane of the chip, the optical signal is combined with a copy of the local oscillator optical signal for each pixel of the receiver array and the frequency difference between the two signals is measured with the help of a coherent detector located in each pixel.

Figure 10:
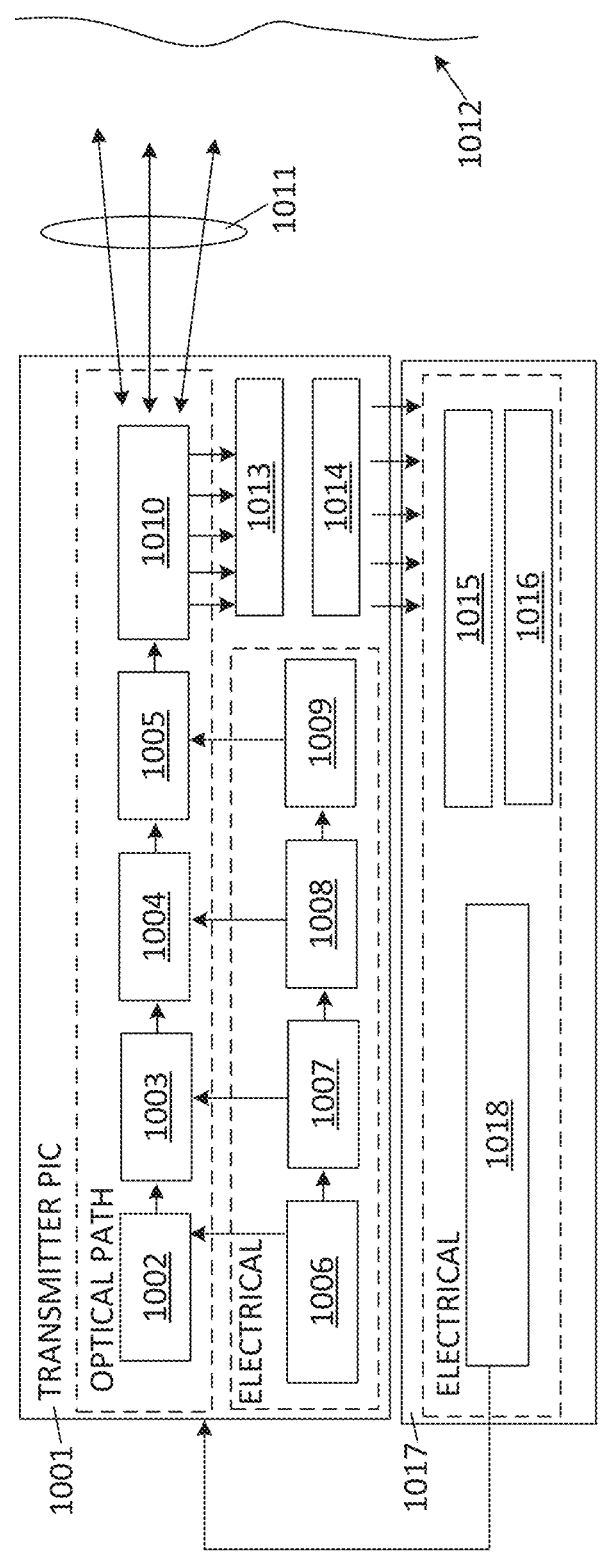
FIG. 10 shows a block diagram of transmitter, receiver, and signal processor for a LiDAR based coherent 3D imaging camera operating in a common outbound/inbound path configuration, according to some example embodiments.

In one implementation illustrated in FIG. 10, the transmit and receive parts of the architecture are monolithically or hybridly integrated into a single PIC architecture 1001. A laser source 1002 with high coherence is driven by laser driver 1006 to generate laser light with fixed optical frequency. The fixed frequency laser signal is coupled into the input of an in-phase quadrature (IQ) modulator 1003. A chirped frequency electrical signal generated by the waveform generator block 1018 in an electrical circuit 1017, according to some example embodiments. In some example embodiments, an integrated circuit waveform generator and amplifier 1007 is used to drive the in-phase IQ modulator 1003 that converts the input fixed frequency optical signal into a chirped frequency optical signal, more specifically an optical signal whose frequency changes from f1 to f2 during a time interval t. The chirped frequency optical signal from the output of the in-phase IQ modulator 1003 is passed through the optical amplifier 1004 powered by electrical driver 1008, in order to be amplified. The optical amplifier 1004 may be a semiconductor optical amplifier or a fiber amplifier. The output of the optical amplifier 1004 serves as input for the optical beam switching 1005. The optical beam switching 1005 has a beam switching driver 1009 associated with it. In one implementation, the optical beam switching 1005 and the beam switching driver 1009 are monolithically integrated on the same optoelectronic chip. The optical beam from each output of the optical beam switching 1005 is directed to a grating coupler, each coupler being part of an array of inbound/outbound couplers and array of coherent detectors array 1010. The grating couplers are shared, in this architecture 1001, between the outbound and inbound optical beams. In the outbound direction the beam is directed by the array of coherent detectors array 1010 to the lens 1011 and from there scanned over the target 1012. On the return, a portion of the signal scattered by target 1012 is coupled back with the help of the grating coupler array into the plane of the array of coherent detectors array 1010 where a portion of the signal is directed for each pixel to a coherent detector. In some example embodiments, the returned light is input into one or more read out and amplification stages 1013 in the receive block which is then input to an analog interface 1014. In some example embodiments, the electrical signal is then input into an ADC 1015 in the electrical circuit 1017, which then undergoes further processing by digital signal processing block 1016, according to some example embodiments.

In one embodiment, the electrical chirp generator, the electrical signal amplifier and the in phase quadrature optical modulator are monolithically integrated on a single chip. In one embodiment, the integration takes place using a silicon on insulator material system or another semiconductor material system. In one embodiment, the fixed frequency laser die is integrated with the electrical chirp generator, the electrical signal amplifier and the in-phase quadrature optical modulator using a hybrid approach in which a trench to accommodate the laser is etched into the monolithic silicon on insulator platform. In one embodiment, the electrical chirp generator, the electrical signal amplifier for the modulator drive signal, the in-phase quadrature optical modulator, and the optical switch network used to scan the optical beam in two dimensions and the driver electronics for the optical switch network are all monolithically integrated on the same chip. In one embodiment, the integration platform is a silicon on insulator platform. In one embodiment, the integration platform contains a semiconductor material. In one embodiment, the fixed frequency laser chip and an optical amplifier 1004 or plurality of optical amplifiers are integrated using a hybrid approach on the same chip as the monolithically integrated electrical chirp generator, the electrical signal amplifier for the modulator drive signal, the in phase quadrature optical modulator, the optical switch network used to scan the optical beam in two dimensions and the driver electronics for the optical switch network. The hybrid integration is achieved using a trench etched into the silicon on insulator platform and the laser and amplifier dies placed into the trench. In one embodiment, the integration platform contains a semiconductor material. In one embodiment, for the outbound optical signal path, the local oscillator and the probe signal paths can be separated and two optical switches may be used, one to direct the local oscillator to the correct group of pixels and one to direct outbound signal to the desired grating coupler.

In one embodiment, the fixed frequency laser chip and an optical amplifier 1004 or plurality of optical amplifiers are integrated using a hybrid approach on the same chip as the monolithically integrated electrical chirp generator, the electrical signal amplifier for the modulator drive signal, the in-phase quadrature optical modulator, the optical switch networks used to direct the outbound optical beam to the desired grating outcoupler as well as the local oscillator to the desired group of pixels to be activated and the driver electronics for the optical switch network as well as the ensemble of pixels distributed in an array; each pixel containing a coherent detector, an optical multiplexer and one or more grating outcouplers.

Figure 11:
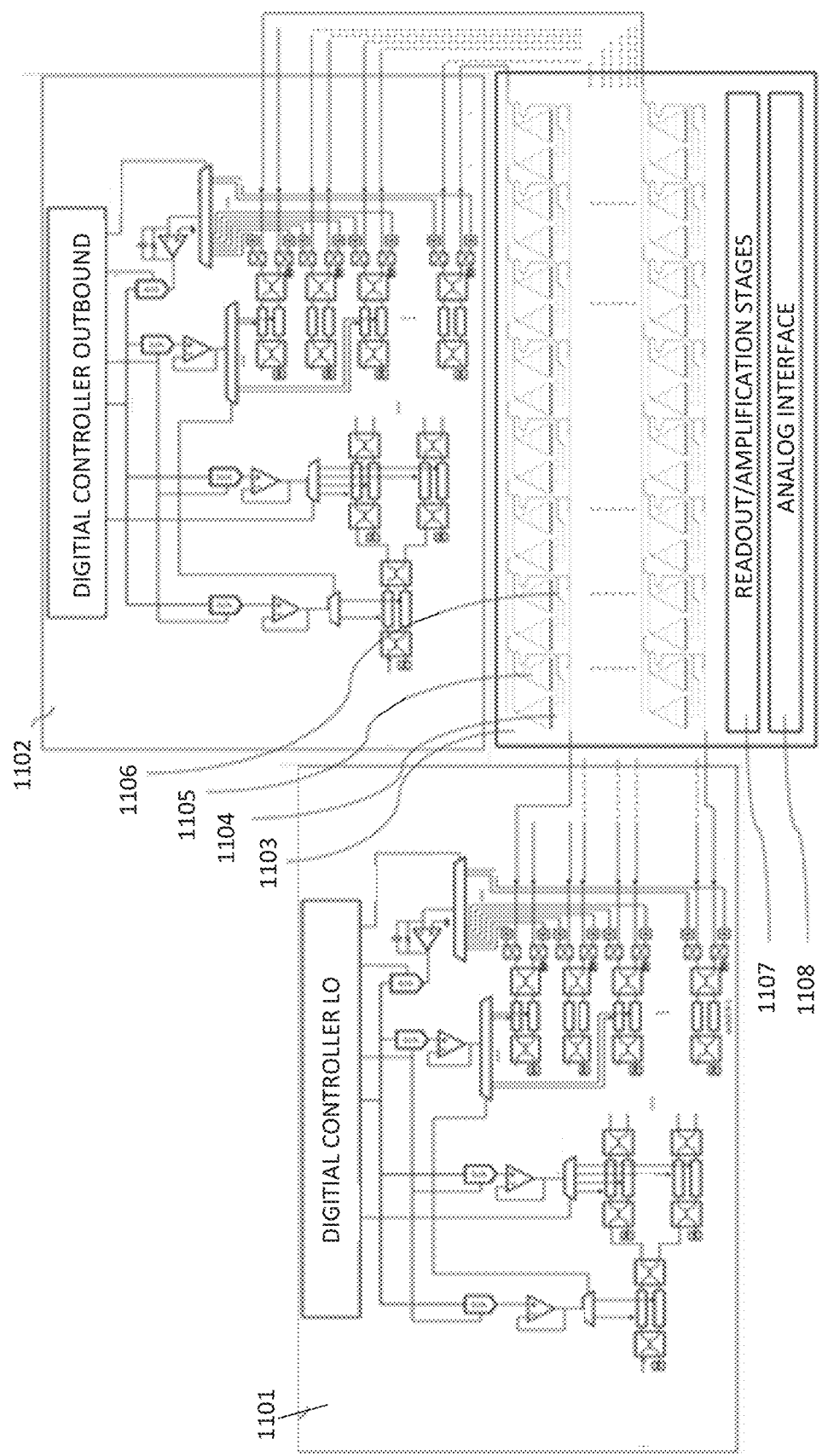
FIG. 11 shows an integrated common path configuration LiDAR system using separate switches for the signal directed to the target and the local oscillator optical signal, according to some example embodiments.

One embodiment of an integrated transceiver array using a common path for both the outbound and the inbound or reflected from target optical signal is illustrated in FIG. 11. Optical switch with integrated control electronics 1101 directs the local oscillator signal to the desired pixel of the coherent pixel array 1103. Optical switch with integrated control electronics 1102 directs the outbound optical signal to the desired pixel or plurality of pixels of the coherent pixel array 1103. The grating outcouplers 1105 of the coherent pixel array 1103 are used to couple the outbound light out of the chip and direct it towards a lens to be collimated as illustrated in FIG. 10 and then towards the target 1012. A portion of the light reflected by the target 1012 is focused by the lens on the same grating outcouplers 1105 that emitted it and coupled back into the plane of the chip and to the detectors 1104 and 1106.

Figure 12:
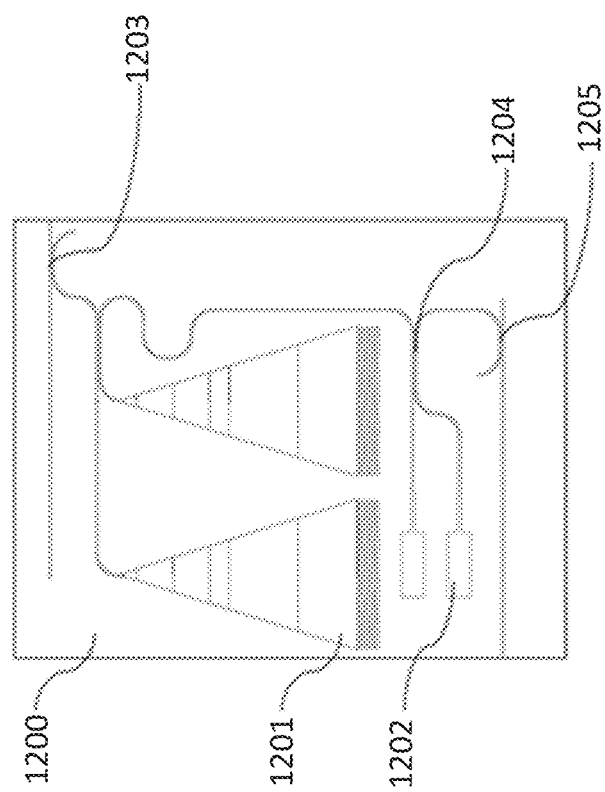
FIG. 12 shows a single pixel configuration for an inbound/outbound path configuration, according to some example embodiments.

The portion of the light reflected off the target 1012 and coupled back into the chip by the grating outcouplers 1105 is combined on detector 1104 with the local oscillator light directed by switches into the corresponding pixel. The detectors 1104 detect an optical signal having a modulation frequency equal to the difference between the local oscillator frequency and the reflected signal frequency and convert it into an electrical signal. The analog electrical signal generated by detectors 1104 is amplified by an on-pixel amplifier and then directed to the readout and amplification stages 1107 and from there to the analog interface 1108. In one embodiment, the readout and amplification stages 1107 are structured in a similar manner as shown in FIG. 2B, being composed of a succession of amplifiers and passive or active multiplexers 254 starting with an on-pixel amplifier and ending with a final amplifier to provide necessary signal strength for the analog to digital conversion and signal processing step. One embodiment of a pixel architecture is shown in FIG. 12. The pixel 1200 is composed of the two grating outcouplers 1201 used to couple light out of the chip as the optical signal is sent towards the target 1012, and back into the chip as a portion of the optical signal is reflected back by the target 1012 and coupled into the chip. The outbound optical signal is coupled into the pixel by coupler 1203 and into the grating outcouplers 1201, while the local oscillator is coupled into the pixel by couplers 1205. The local oscillator and the portion of the optical signal reflected by the target 1012 are combined with the use of coupler 1204 on detectors 1202.

Figure 13:
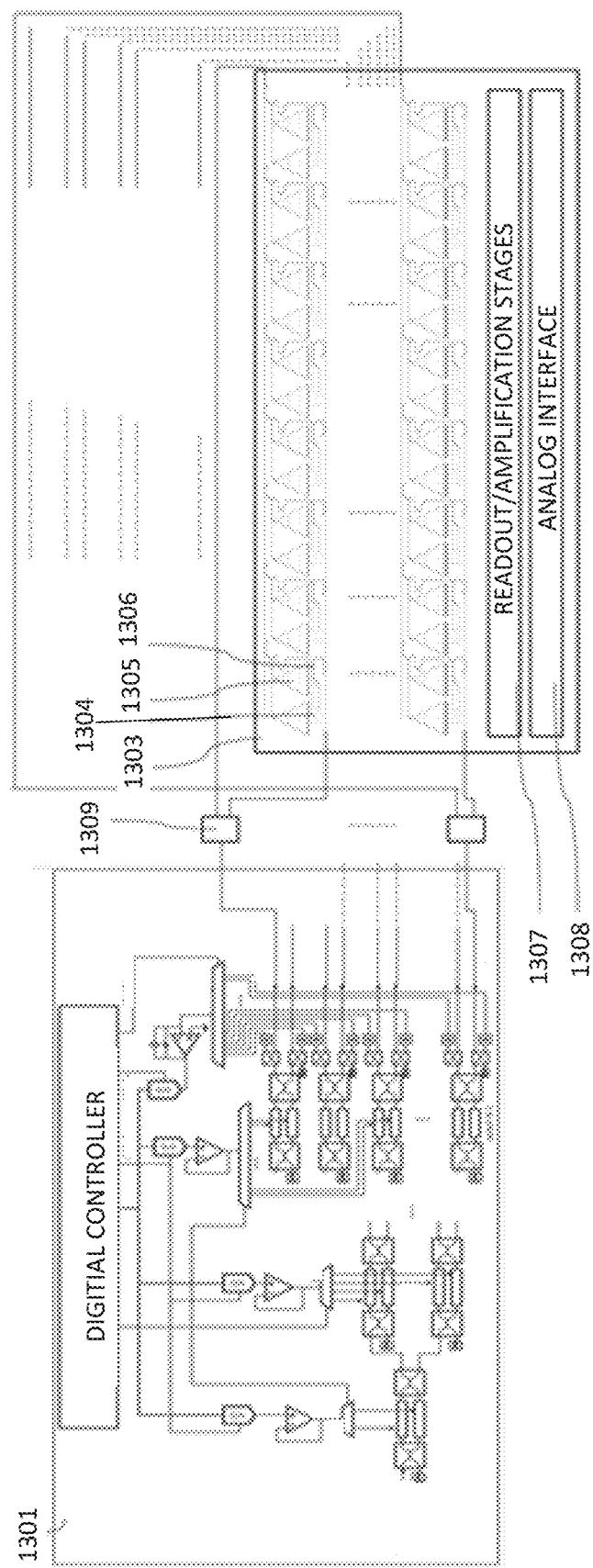
FIG. 13 shows an integrated common path configuration LiDAR system using a common switch for the signal directed to the target and the local oscillator, according to some example embodiments.

In one embodiment illustrated in FIG. 13, one optical switch 1301 is used to control the distribution of both the probe signal to be sent towards the target as well as the local oscillator signal to be provided to the array of coherent detectors. The optical switch 1301 with integrated control electronics directs the local oscillator signal to the desired pixel of the coherent pixel array 1303. The optical switch 1301 implements integrated control electronics to direct the outbound optical signal to the desired pixel or plurality of pixels of the coherent pixel array 1303. The grating outcouplers 1305 of the coherent pixel array 1303 are used to couple the outbound light out of the chip and direct it towards a lens to be collimated as illustrated in FIG. 10 (e.g., lens 1011) and then towards the target. Once the optical signal has been directed to the desired pixel or ensemble of pixels the signal is split with the help of a passive or active demultiplexer 1309 into one or a plurality of optical signals to provide for local oscillator and into one or a plurality of optical signals to provide for the probe signal to be directed towards the target.

A portion of the light reflected by the target is focused by the lens on the same grating outcouplers 1305 that emitted it and coupled back into the plane of the chip and to the detectors. The portion of the light reflected off the target and coupled back into the chip by the grating outcouplers 1305 is combined on detector 1304 with the local oscillator light directed by the switch into the corresponding pixel. The detectors (e.g., grating outcouplers) detect an optical signal having a modulation frequency equal to the difference between the local oscillator frequency and the reflected signal frequency and convert it into an electrical signal. The analog electrical signal generated by detectors 1304 and 1306 is amplified by an on-pixel amplifier and then directed to the readout amplification stages 1307 and from there to the analog interface 1308.

Figure 14:
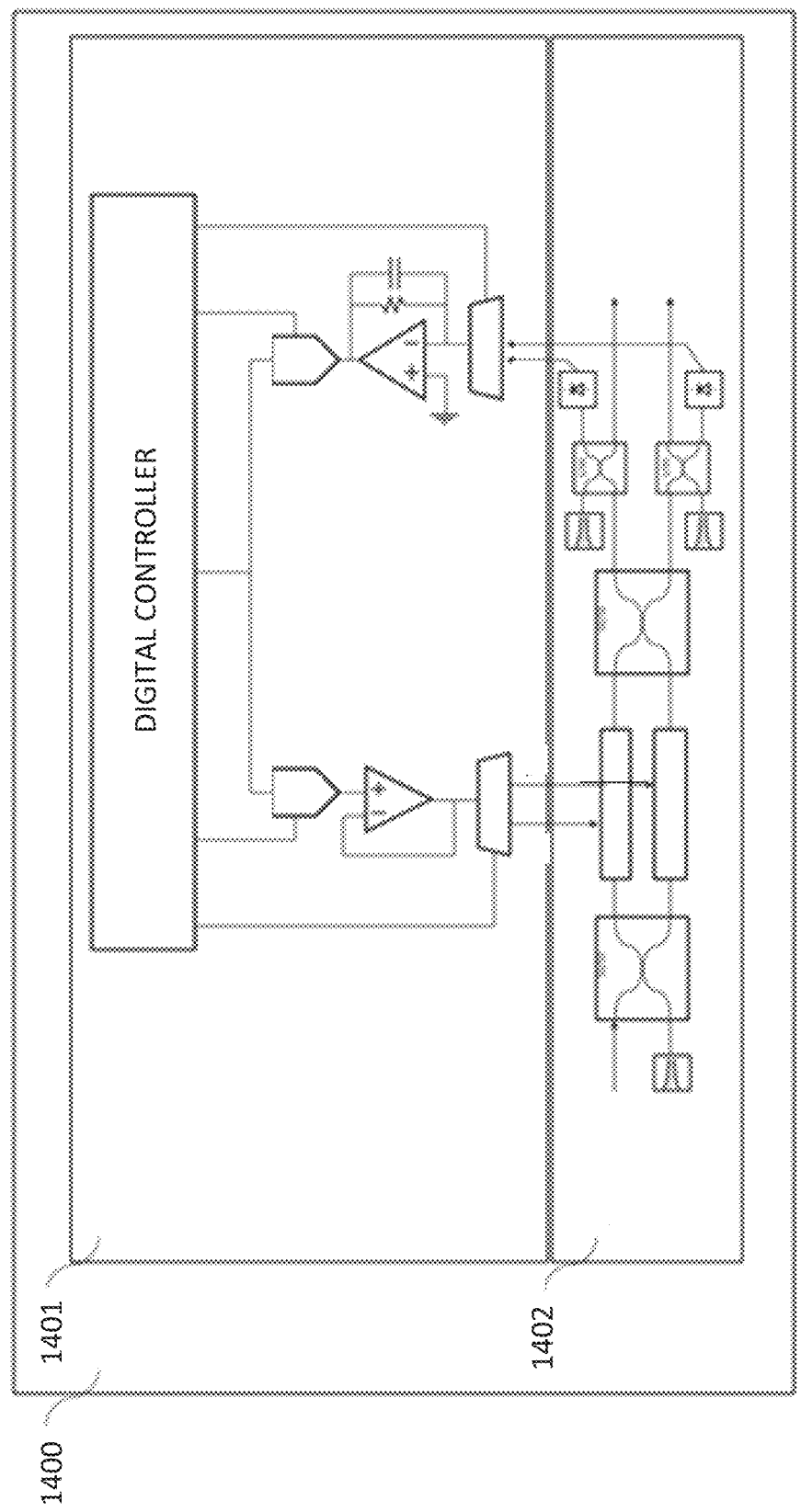
FIG. 14 shows a beam scanning module where the driver IC and the switch PIC are separate, according to some example embodiments.
Figure 15:
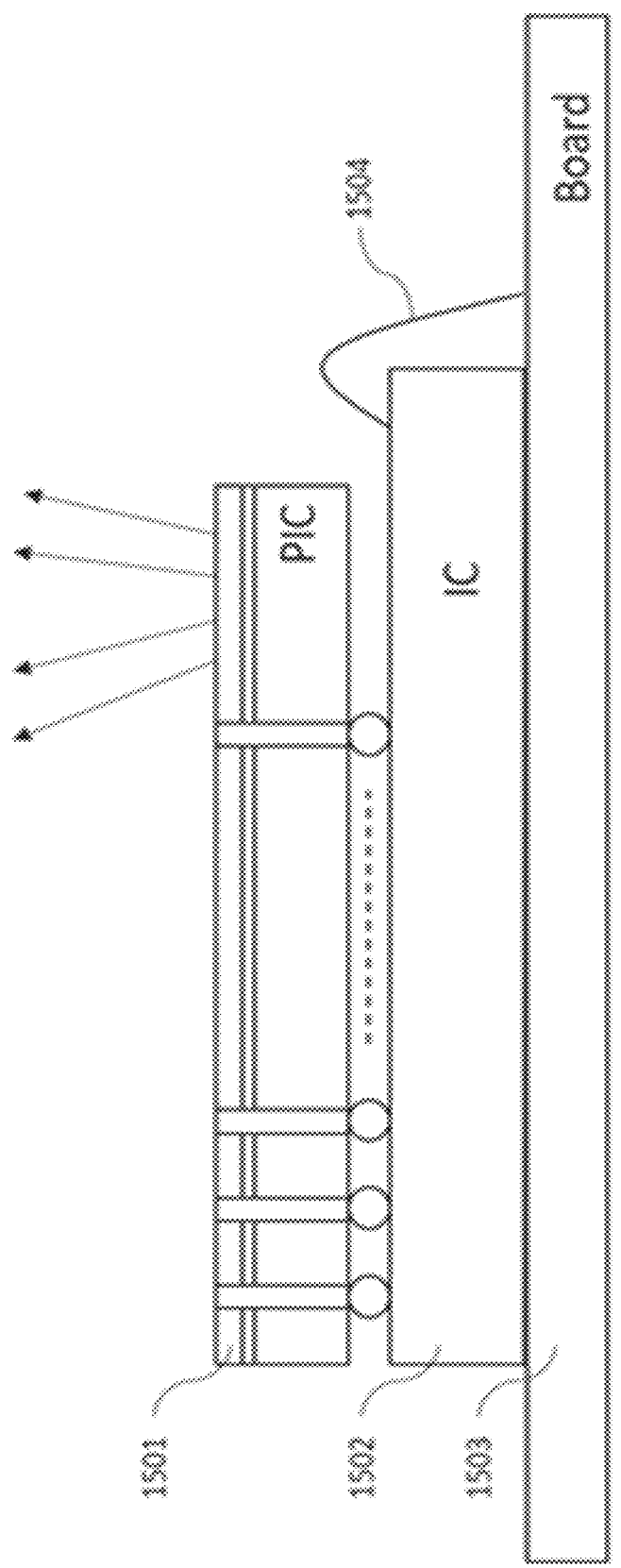
FIG. 15 shows a system in a package configuration using through silicon vias (TSVs) and a combination of wirebonds and ball grid arrays, according to some example embodiments.
Figure 16:
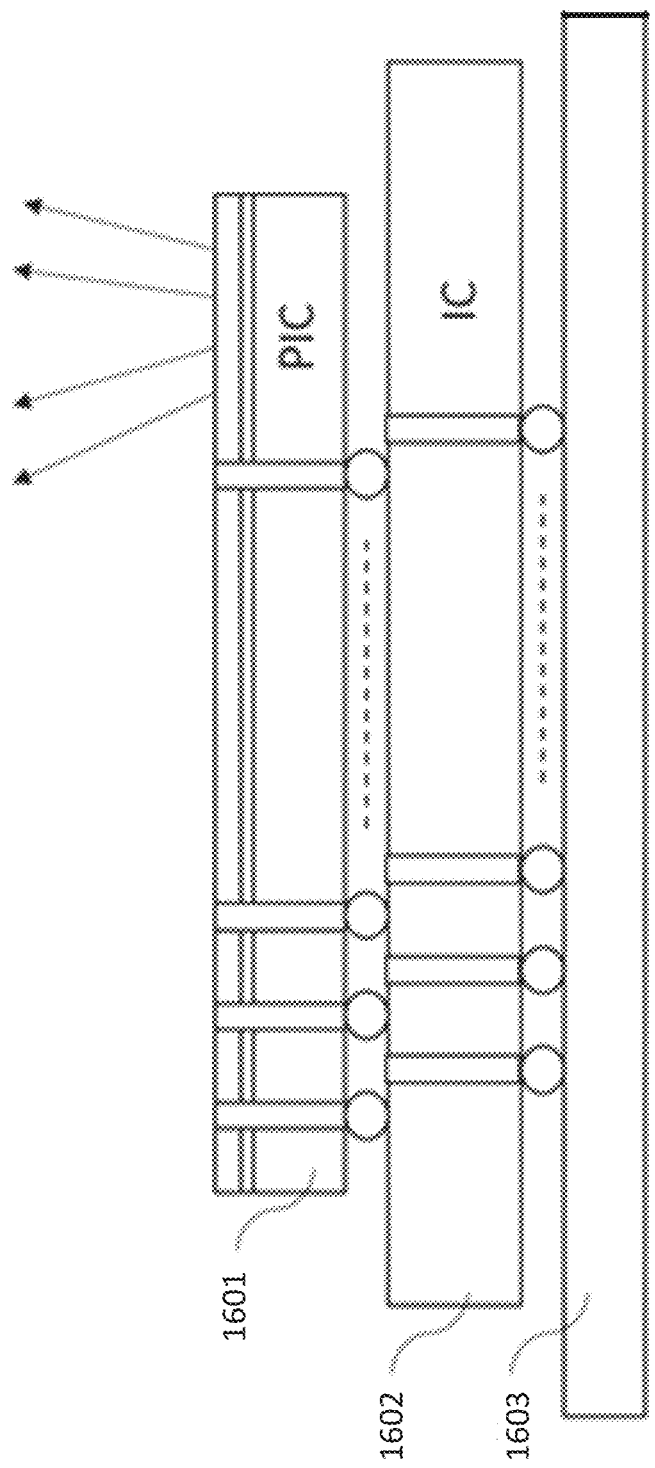
FIG. 16 shows a system in a package configuration using through silicon vias (TSVs) and ball grid arrays, according to some example embodiments.
Figure 17:
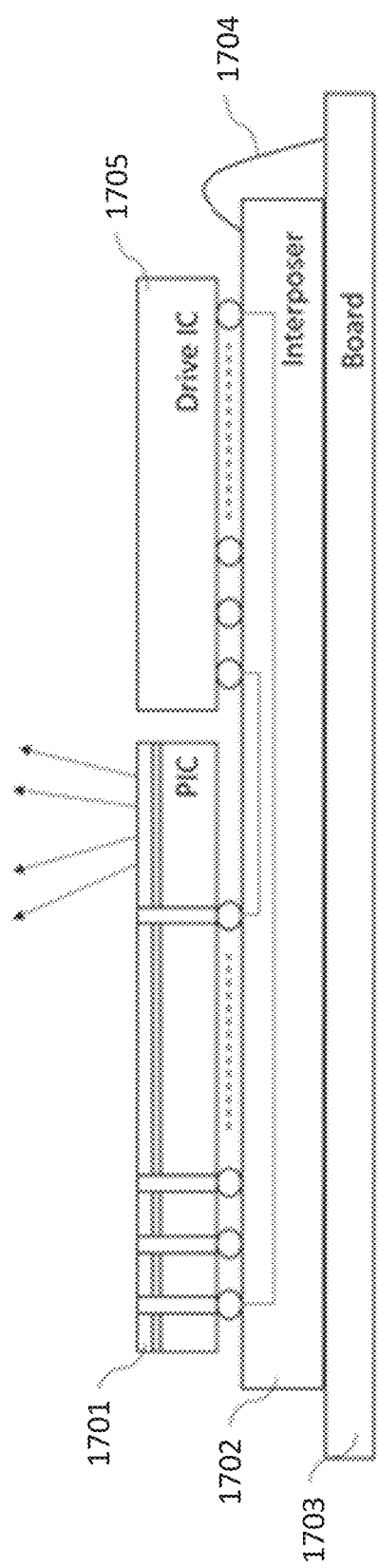
FIG. 17 shows a system in a package configuration using through silicon vias (TSVs) and an interposer combined with wirebonds and ball grid arrays, according to some example embodiments.

In the architecture 1400 illustrated in FIG. 14, the optical beam scanning module is implemented in a system in a package configuration having therefore a driver electronic circuit 1401 of the optical switch being on a separate chip compared to the optical switch photonic integrated circuit (PIC) 1402. Several implementations of the system in a package configuration are shown in FIGS. 15, 16 and 17. The advantage of the system in a package configuration is that it allows for use of different process technologies for the fabrication of the optical switch PIC 1402 and the driver electronic circuit 1401 as for example a higher voltage process for the driver electronic circuit 1401. The high drive voltages allow for shorter thermo-optic phase shifters to be used in the design of the optical switch and therefore improve optical switch performance parameters such as loss. For the PIC side, the freedom to use a thicker SOI top layer allows for better optical power handling capabilities of the switch and beam scanning assembly as nonlinear effects onset can be shifted to a higher threshold. In FIG. 15 a stacked system in a package configuration is illustrated. Through silicon vias (TSVs) are used to connect the metal layer of the PIC 1501 with the metal layer of the driver integrated circuit 1502 (IC) situated below. The driver IC 1502 is attached to the board 1503 and the electrical connection is realized with wirebonds 1504 around the perimeter.

In FIG. 16 a configuration is shown in which through silicon vias and ball grid arrays are used to connect both the PIC 1601 with the IC 1602 underneath it as well as the IC 1602 with the board 1603. In FIG. 17, a side by side configuration using an interposer to connect the two chips is illustrated. The PIC 1701 is connected with the interposer 1702 using through silicon vias and a ball grid array. The driver IC 1705 is flipped on top of the interposer 1702. The connection between the PIC 1701 and the driver IC 1705 is done through the interposer 1702. The interposer 1702 is connected to the board 1703 through the wirebonds 1704.

Figure 18:
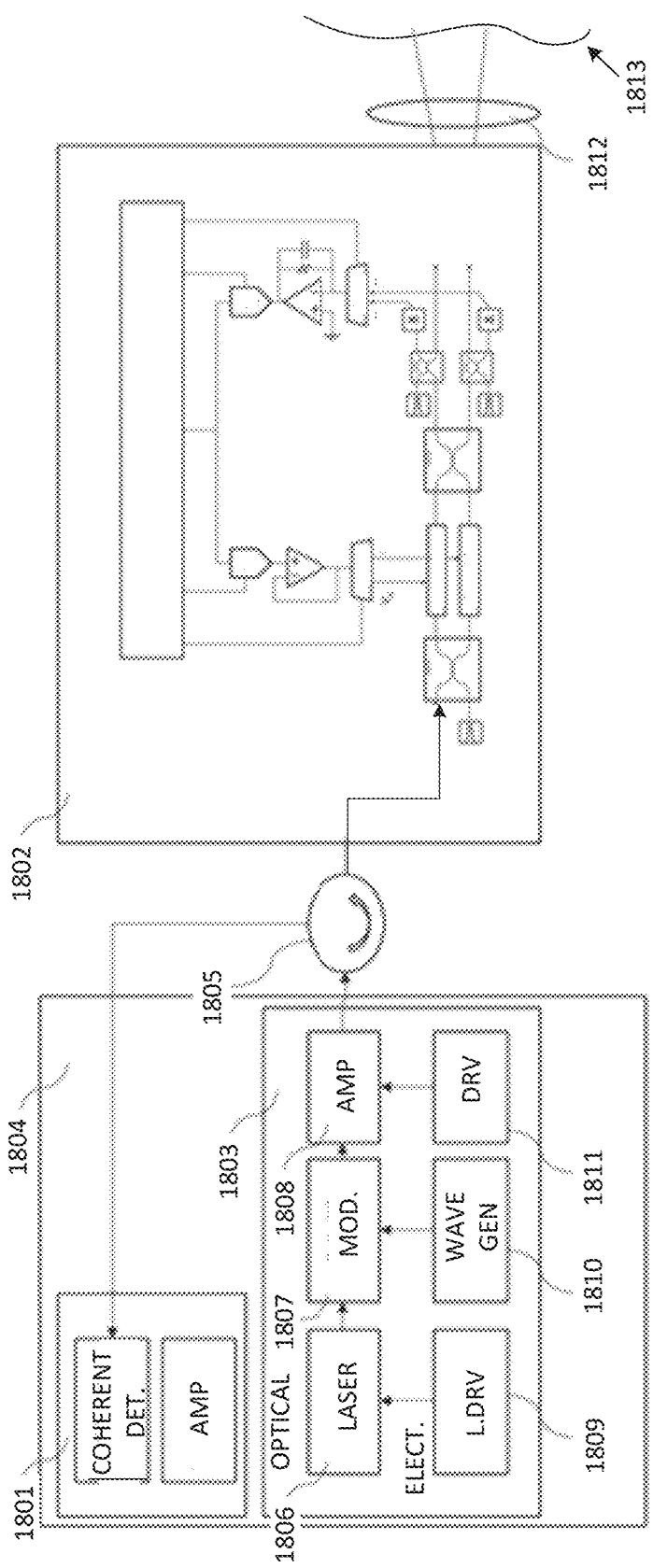
FIG. 18 shows an integrated LIDAR system using a single transmit/receive path and single detector combined with a circulator configuration per channel, according to some example embodiments.

In one implementation illustrated in FIG. 18, a single detector can be used instead of the coherent detector array in conjunction with a circulator. In this implementation, a frequency modulated optical signal is generated by transmitter 1803. An electrical laser driver 1809 drives a fixed frequency laser source 1806 to generate a fixed frequency optical signal. The optical IQ modulator 1807 driven by the electrical waveform generator and amplifier 1810 creates a chirped frequency optical signal that is then amplified by optical amplifier 1808 driven by driver 1811. The amplified optical signal is directed from port 1 to port 2 of an optical circulator to the optical beam scanning PIC 1802. The output of the optical beam scanning PIC 1802 is directed through lens 1812 to target 1813. A portion of the reflected signal from target 1813 is coupled back through a grating outcoupler 1201 into the optical beam scanning PIC 1802 and then back to the input into the optical beam scanning PIC 1802 and to port 2 of the circulator. The reflected optical signal is directed from port 2 of the optical circulator 1805 to port 3 of the circulator and to coherent detector 1801. In one embodiment, the coherent detector 1801 and transmitter 1803 is integrated into a single PIC 1804. In one embodiment, that PIC 1804 contains silicon. In one embodiment, that PIC 1804 contains a semiconductor material. In one embodiment, the beam scanning mechanism is integrated into a single optical beam scanning PIC 1802. In one embodiment, optical beam scanning PIC 1802 contains silicon or another semiconductor material. In one embodiment, the setup described in FIG. 18 can be replicated into multiple parallel channels. In one embodiment, multiple transmit channels and multiple coherent detectors may be integrated on the same optical beam scanning PIC 1802. Similarly, multiple parallel steering channels can be integrated into the optical beam scanning PIC 1802.

Figure 19:
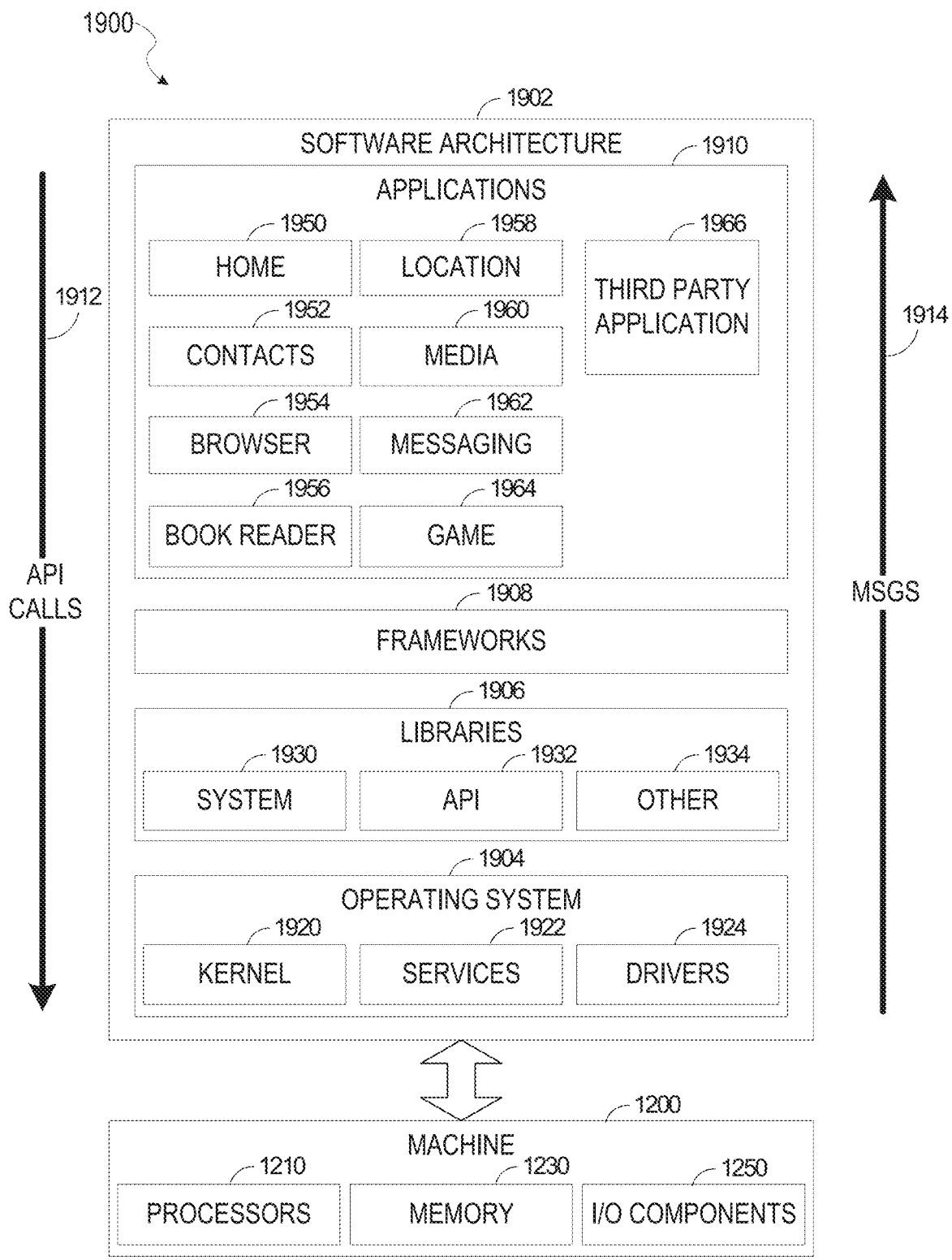
FIG. 19 is a block diagram illustrating a representative software architecture, which may be used in conjunction with various hardware architectures herein described.

FIG. 19 is a block diagram 1900 illustrating an architecture of software 1902, which can be installed on any one or more of the devices described above. FIG. 19 is merely a non-limiting example of a software architecture, and it will be appreciated that many other architectures can be implemented to facilitate the functionality described herein. In various embodiments, the software 1902 is implemented by hardware such as a machine 2000 of FIG. 20 that includes processors 2010, memory 2030, and I/O components 2050. In this example architecture, the software 1902 can be conceptualized as a stack of layers where each layer may provide a particular functionality. For example, the software 1902 includes layers such as an operating system 1904, libraries 1906, frameworks 1908, and applications 1910. Operationally, the applications 1910 invoke application programming interface (API) calls 1912 through the software stack and receive messages 1914 in response to the API calls 1912, consistent with some embodiments.

In various implementations, the operating system 1904 manages hardware resources and provides common services. The operating system 1904 includes, for example, a kernel 1920, services 1922, and drivers 1924. The kernel 1920 acts as an abstraction layer between the hardware and the other software layers, consistent with some embodiments. For example, the kernel 1920 provides memory management, processor management (e.g., scheduling), component management, networking, and security settings, among other functionality. The services 1922 can provide other common services for the other software layers. The drivers 1924 are responsible for controlling or interfacing with the underlying hardware, according to some embodiments. For instance, the drivers 1924 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1906 provide a low-level common infrastructure utilized by the applications 1910. The libraries 1906 can include system libraries 1930 (e.g., C standard library) that can provide functions such as memory allocation functions, string manipulation functions, mathematic functions, and the like. In addition, the libraries 1906 can include API libraries 1932 such as media libraries (e.g., libraries to support presentation and manipulation of various media formats such as moving picture experts group-4 (MPEG4), advanced video coding (H.264 or AVC), moving picture experts group layer-3 (MP3), advanced audio coding (AAC), adaptive multi-rate (AMR) audio codec, joint photographic experts group (JPEG or JPG), or portable network graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 1906 can also include a wide variety of other libraries 1934 to provide many other APIs to the applications 1910.

The frameworks 1908 provide a high-level common infrastructure that can be utilized by the applications 1910, according to some embodiments. For example, the frameworks 1908 provide various graphic user interface (GUI) functions, high-level resource management, high-level location services, and so forth. The frameworks 1908 can provide a broad spectrum of other APIs that can be utilized by the applications 1910, some of which may be specific to a particular operating system or platform.

In an example embodiment, the applications 1910 include a home application 1950, a contacts application 1952, a browser application 1954, a book reader application 1956, a location application 1958, a media application 1960, a messaging application 1962, a game application 1964, and a broad assortment of other applications such as a third-party application 1966. According to some embodiments, the applications 1910 are programs that execute functions defined in the programs. Various programming languages can be employed to create one or more of the applications 1910, structured in a variety of manners, such as object-oriented programming languages (e.g., Objective-C, Java, or C++) or procedural programming languages (e.g., C or assembly language). In a specific example, the third-party application 1966 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1966 can invoke the API calls 1912 provided by the operating system 1904 to facilitate functionality described herein.

Figure 20:
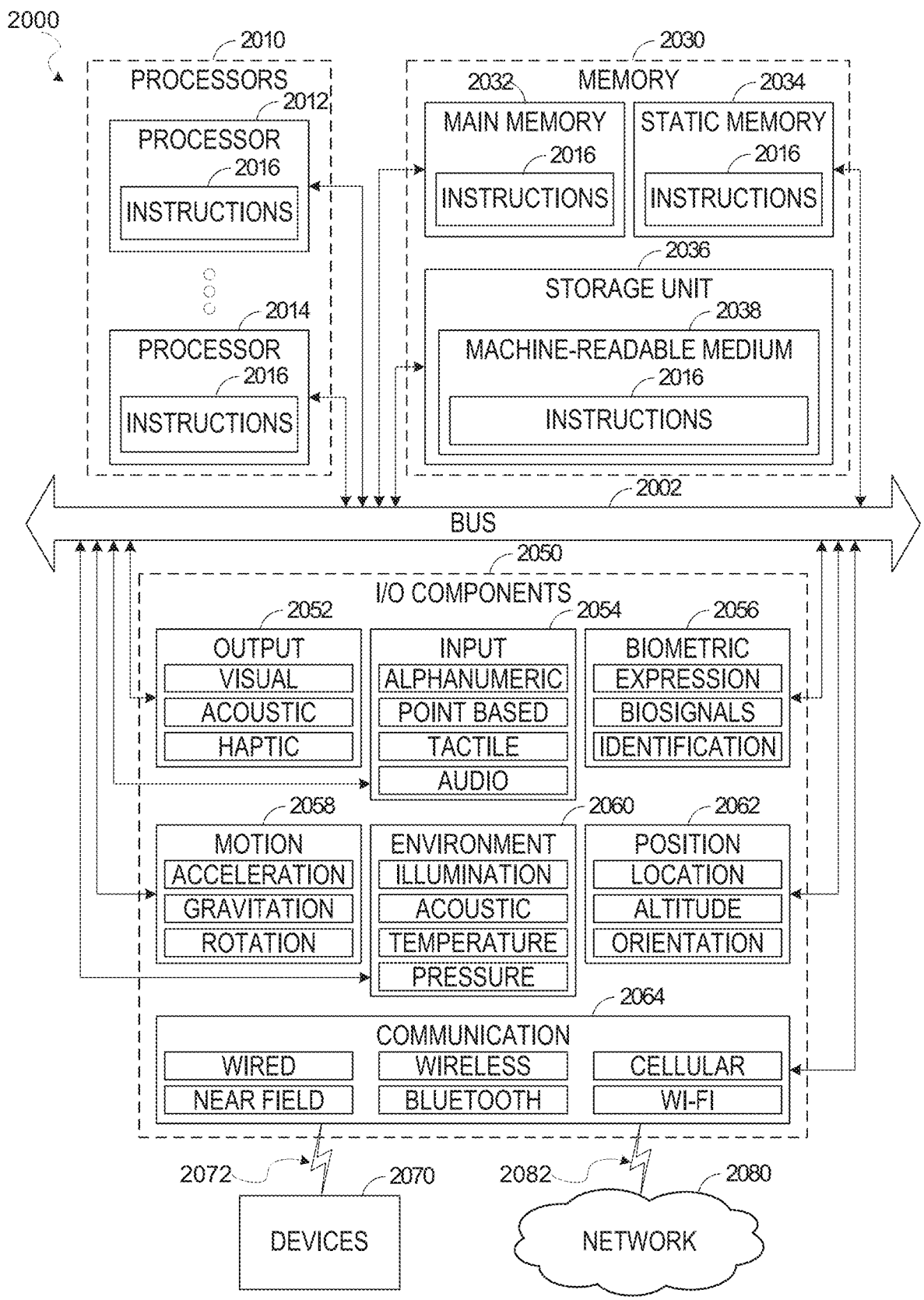
FIG. 20 is a block diagram illustrating components of a machine, according to some example embodiments, able to read instructions from a machine-readable medium (e.g., a machine-readable storage medium) and perform any one or more of the methodologies discussed herein.

FIG. 20 illustrates a diagrammatic representation of a machine 2000 in the form of a computer system within which a set of instructions may be executed for causing the machine to perform any one or more of the methodologies discussed herein, according to an example embodiment. Specifically, FIG. 20 shows a diagrammatic representation of the machine 2000 in the example form of a computer system, within which instructions 2016 (e.g., software, a program, an application, an applet, an app, or other executable code) for causing the machine 2000 to perform any one or more of the methodologies discussed herein may be executed. The instructions 2016 transform the general, non-programmed machine 2000 into a particular machine 2000 programmed to carry out the described and illustrated functions in the manner described. In alternative embodiments, the machine 2000 operates as a standalone device or may be coupled (e.g., networked) to other machines. In a networked deployment, the machine 2000 may operate in the capacity of a server machine or a client machine in a server-client network environment, or as a peer machine in a peer-to-peer (or distributed) network environment. The machine 2000 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2016, sequentially or otherwise, that specify actions to be taken by the machine 2000. Further, while only a single machine 2000 is illustrated, the term "machine" shall also be taken to include a collection of machines 2000 that individually or jointly execute the instructions 2016 to perform any one or more of the methodologies discussed herein.

The machine 2000 may include processors 2010, memory 2030, and I/O components 2050, which may be configured to communicate with each other such as via a bus 2002. In an example embodiment, the processors 2010 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) may include, for example, a processor 2012 and a processor 2014 that may execute the instructions 2016. The term "processor" is intended to include multi-core processors that may comprise two or more independent processors 2010 (sometimes referred to as "cores") that may execute instructions 2106 contemporaneously. Although FIG. 20 shows multiple processors 2010, the machine 2000 may include a single processor 2016 with a single core, a single processor 2012 with multiple cores (e.g., a multi-core processor), multiple processors 2010 with a single core, multiple processors 2010 with multiples cores, or any combination thereof.

The memory 2030 may include a main memory 2032, a static memory 2034, and a storage unit 2036, both accessible to the processors 2010 such as via the bus 2002. The main memory 2030, the static memory 2034, and storage unit 2036 store the instructions 2016 embodying any one or more of the methodologies or functions described herein. The instructions 2016 may also reside, completely or partially, within the main memory 2032, within the static memory 2034, within the storage unit 2036, within at least one of the processors 2010 (e.g., within the processor's cache memory), or any suitable combination thereof, during execution thereof by the machine 2000.

The I/O components 2050 may include a wide variety of components to receive input, provide output, produce output, transmit information, exchange information, capture measurements, and so on. The specific I/O components 2050 that are included in a particular machine 2000 will depend on the type of machine. For example, portable machines such as mobile phones will likely include a touch input device or other such input mechanisms, while a headless server machine will likely not include such a touch input device. It will be appreciated that the I/O components 2050 may include many other components that are not shown in FIG. 20. The I/O components 2050 are grouped according to functionality merely for simplifying the following discussion and the grouping is in no way limiting. In various example embodiments, the I/O components 2050 may include output components 2052 and input components 2054. The output components 2052 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2054 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 2050 may include biometric components 2056, motion components 2058, environmental components 2060, or position components 2062, among a wide array of other components. For example, the biometric components 2056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 2058 may include acceleration sensor components (e.g., accelerometer), gravitation sensor components, rotation sensor components (e.g., gyroscope), and so forth. The environmental components 2060 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 2062 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2050 may include communication components 2064 operable to couple the machine 2000 to a network 2080 or devices 2070 via a coupling 2082 and a coupling 2072, respectively. For example, the communication components 2064 may include a network interface component or another suitable device to interface with the network 2080. In further examples, the communication components 2064 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 2070 may be another machine or any of a wide variety of peripheral devices (e.g., a peripheral device coupled via a USB).

Moreover, the communication components 2064 may detect identifiers or include components operable to detect identifiers. For example, the communication components 2064 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2064, such as location via Internet Protocol (IP) geolocation, location via Wi-Fi® signal triangulation, location via detecting an NFC beacon signal that may indicate a particular location, and so forth.

The various memories (i.e., 2030, 2032, 2034, and/or memory of the processor(s) 2010) and/or storage unit 2036 may store one or more sets of instructions 2016 and data structures (e.g., software) embodying or utilized by any one or more of the methodologies or functions described herein. These instructions (e.g., the instructions 2016), when executed by processor(s) 2010, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions 2016 and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 2080 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 2080 or a portion of the network 2080 may include a wireless or cellular network, and the coupling 2082 may be a Code Division Multiple Access (CDMA) connection, a Global System for Mobile communications (GSM) connection, or another type of cellular or wireless coupling. In this example, the coupling 2082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 2016 may be transmitted or received over the network 2080 using a transmission medium via a network interface device (e.g., a network interface component included in the communication components 2064) and utilizing any one of a number of well-known transfer protocols (e.g., hypertext transfer protocol (HTTP)). Similarly, the instructions 2016 may be transmitted or received using a transmission medium via the coupling 2072 (e.g., a peer-to-peer coupling) to the devices 2070. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 2016 for execution by the machine 2000, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

The following are example embodiments:

Example 1. A method comprising: generating a light beam using an integrated light source in an optical transmitter photonic integrated circuit (PIC); splitting the light beam into multiple outgoing beams to a target object, the light beam split into the multiple outgoing beams by an optical switch tree in the transmitter PIC, the optical switch tree comprising one or more optical switches controlled by an electronic switch control circuit integrated in the transmitter PIC, the electronic switch control circuit comprising an electrical multiplexer to generate feedback signal for control of the one or more optical switches using a demultiplexer in the electronic switch control circuit to compensate for changes in optical loss; transmitting the multiple outgoing beams to a target using a plurality of couplers in the transmitter PIC; receiving reflected light beams from the target using an optical receiver array; and determining, using one or more processors of a machine, ranging information from the reflected light beams.

Example 2. The method of example 1, wherein each of the one or more optical switches comprises photodetectors to generate current from the multiple outgoing beams, the current being input into the electrical multiplexer to generate the feedback signal.

Example 3. The method of any of examples 1 or 2, wherein the demultiplexer receives a selection setting that is set using the feedback signal.

Example 4. The method of any of examples 1-3, wherein each of the one or more optical switches comprise one or more phase shifters to change the optical loss, wherein the phase shifters are adjusted by the selection setting of the demultiplexer.

Example 5. The method of any of examples 1-4, wherein a change in temperature of the transmitter PIC causes a change in the optical loss and wherein the electronic switch control circuit compensates by changing the selection setting of the demultiplexer to change phase shifts of the one or more phase shifters.

Example 6. The method of any of examples 1-5, wherein the electronic switch control circuit includes a digital to analog converter (DAC) that sets the selection setting of the demultiplexer based on the feedback signal.

Example 7. The method of any of examples 1-6, wherein the DAC sets the selection setting based on preconfigured values stored in the electronic switch control circuit.

Example 8. The method of any of examples 1-7, wherein the phase shifters are heaters that change a phase of light propagating through waveguides of the one or more optical switches.

Example 9. The method of any of examples 1-8, wherein the optical receiver array is a coherent optical receiver.

Example 10. The method of any of examples 1-9, wherein the coherent optical receiver is integrated in the transmitter PIC.

Example 11. The method of any of examples 1-10, wherein the ranging information is a point cloud comprising a plurality of points that correspond to portions of the reflect light beams.

Example 12. The method of any of examples 1-11, wherein each of the plurality of points includes a distance value to the target.

Example 13. The method of any of examples 1-12, wherein each of the plurality of points includes a velocity value indicating a velocity for the target.

Example 14. The method of any of examples 1-13, wherein the integrated light source is an optical frequency chirp generator.

Example 15. The method of any of examples 1-15, wherein the plurality of couplers is a plurality of optical gratings that transmit the multiple outgoing beams.

Example 16. The method of any of examples 1-15, wherein the plurality of optical grating receives the reflected light beams.

Example 17. A light ranging system comprising: a transmitter photonic integrated circuit (PIC) comprising an integrated light source to generate a light beam, the transmitter PIC comprising an optical switch tree that splits the light beam into multiple outgoing beams to be transmitted towards a target, the optical switch tree comprising one or more optical switches controlled by an electronic switch control circuit integrated in the transmitter PIC, the electronic switch control circuit comprising an electrical multiplexer to generate feedback signal for control of the one or more optical switches using a demultiplexer in the electronic switch control circuit to compensate for changes in optical loss; an optical receiver array to receive reflected light beams from the target; and a processor of a machine and memory storing instructions that when executed by the processor cause the machine to perform operations comprising: determining ranging information from the reflected light beams.

Example 18. The light ranging system of example 17, wherein each of the one or more optical switches comprises photodetectors to generate current from the multiple outgoing beams, the current being input into the electrical multiplexer to generate the feedback signal.

Example 19. The light ranging system of any of examples 17 or 18, wherein the demultiplexer receives a selection setting that is set using the feedback signal.

Example 20. The light ranging system of any of examples 1-19, wherein each of the one or more optical switches comprise one or more phase shifters to change the optical loss, wherein the phase shifters are adjusted by the selection setting of the demultiplexer.

What is claimed is:

1. A method comprising:
generating a light beam using an integrated light source in an optical transmitter photonic integrated circuit (PIC);
splitting the light beam into multiple outgoing beams to a target object, the light beam split into the multiple outgoing beams by an optical switch tree in the transmitter PIC, the optical switch tree comprising one or more optical switches controlled by an electronic switch control circuit integrated in the transmitter PIC, the electronic switch control circuit comprising an electrical multiplexer to generate a feedback signal for control of the one or more optical switches using a demultiplexer in the electronic switch control circuit to compensate for changes in optical loss, each of the one or more optical switches comprising photodetectors to generate a current from the multiple outgoing beams, the current being input into the electrical multiplexer to generate the feedback signal, each one of the one or more optical switches comprising two phase shifters driven by outputs of the demultiplexer, the demultiplexer receiving a selection setting that is set using the feedback signal;
transmitting the multiple outgoing beams to a target using a plurality of couplers in the transmitter PIC;
receiving reflected light beams from the target using an optical receiver array; and
generating, using one or more processors of a machine, ranging information from the reflected light beams.

2. The method of claim 1, wherein a change in temperature of the transmitter PIC causes a change in the optical loss and wherein the electronic switch control circuit compensates by changing the selection setting of the demultiplexer to change phase shifts of one or more of the two phase shifters.

3. The method of claim 1, wherein the demultiplexer has an input selectively fed to one of the outputs as a function of the selection setting, and wherein the electronic switch control circuit includes a digital to analog converter (DAC) adapted to feed a signal to the input of the demultiplexer based on the feedback signal.

4. The method of claim 3, wherein the DAC sets the selection setting based on preconfigured values stored in the electronic switch control circuit.

5. The method of claim 1, wherein the phase shifters are heaters that change a phase of light propagating through waveguides of the one or more optical switches.

6. The method of claim 1, wherein the optical receiver array is a coherent optical receiver.

7. The method of claim 6, wherein the coherent optical receiver is integrated in the transmitter PIC.

8. The method of claim 1, wherein the ranging information is a point cloud comprising a plurality of points that correspond to portions of the reflected light beams.

9. The method of claim 8, wherein each of the plurality of points includes a distance value to the target.

10. The method of claim 9, wherein each of the plurality of points includes a velocity value indicating a velocity for the target.

11. The method of claim 1, wherein the integrated light source is an optical frequency chirp generator.

12. The method of claim 1, wherein the plurality of couplers is a plurality of optical gratings that transmit the multiple outgoing beams.

13. The method of claim 12, wherein the plurality of optical gratings receives the reflected light beams.

14. A light ranging system comprising:
a transmitter photonic integrated circuit (PIC) comprising an integrated light source to generate a light beam, the transmitter PIC comprising an optical switch tree that splits the light beam into multiple outgoing beams to be transmitted towards a target, the optical switch tree comprising one or more optical switches controlled by an electronic switch control circuit integrated in the transmitter PIC, the electronic switch control circuit comprising an electrical multiplexer to generate a feedback signal for control of the one or more optical switches using a demultiplexer in the electronic switch control circuit to compensate for changes in optical loss, each of the one or more optical switches comprising photodetectors to generate a current from the multiple outgoing beams, the current being input into the electrical multiplexer to generate the feedback signal, each one of the one or more optical switches comprising two phase shifters driven by outputs of the demultiplexer, the demultiplexer receiving a selection setting that is set using the feedback signal;
an optical receiver array to receive reflected light beams from the target; and
a processor of a machine and memory storing instructions that when executed by the processor cause the machine to perform operations comprising determining ranging information from the reflected light beams.

15. A method comprising:
generating a light beam using an integrated light source in an optical transmitter photonic integrated circuit, wherein the optical transmitter photonic integrated circuit comprises:
an optical switch tree with optical switches, wherein each optical switch comprises two thermal phase shifters between two couplers, and wherein the optical switch tree further comprises photodetectors, and
an electronic switch control circuit with an electrical multiplexer connected to the photodetectors and an electronic demultiplexer connected to the thermal phase shifters;
the method further comprising:
splitting the light beam into multiple outgoing beams to a target object by the optical switch tree;
generating, by means of the photodetectors, currents from the multiple outgoing beams and generating a feedback signal from the electrical multiplexer;
controlling the optical switch tree using the feedback signal to generate a selection setting of the electronic demultiplexer;
transmitting the multiple outgoing beams to a target using a plurality of further couplers in the optical transmitter photonic integrated circuit;
receiving reflected light beams from the target using an optical receiver array; and generating, using one or more processors of a machine, ranging information from the reflected light beams.

16. The method of claim 15, wherein the electronic demultiplexer has an input selectively fed to an output of the electronic demultiplexer as a function of the selection setting, and wherein the electronic switch control circuit includes a digital to analog converter feeding a signal to the input of the electronic demultiplexer based on the feedback signal.

\* \* \* \* \*

UNITED STATES PATENT AND TRADEMARK OFFICE
CERTIFICATE OF CORRECTION

| | | |
|---|---|---|
| PATENT NO. | : 12,270,949 B2 | Page 1 of 1 |
| APPLICATION NO. | : 17/096399 | |
| DATED | : April 8, 2025 | |
| INVENTOR(S) | : Piggott et al. | |

It is certified that error appears in the above-identified patent and that said Letters Patent is hereby corrected as shown below:

In the Specification

In Column 3, Line 63, delete "cap ability." and insert --capability.-- therefor

In Column 7, Line 35, delete "ith" and insert --i-th-- therefor

In Column 7, Line 36, delete "ith" and insert --i-th-- therefor

In Column 10, Line 37, delete "n" and insert --π-- therefor

In Column 18, Line 38, delete "2106" and insert --2016-- therefor

In Column 18, Line 40, delete "2016" and insert --2014-- therefor

In Column 18, Line 48, delete "2030," and insert --2032,-- therefor

Signed and Sealed this
Twenty-fourth Day of June, 2025

Coke Morgan Stewart
*Acting Director of the United States Patent and Trademark Office*